United States Patent
Hooker

(10) Patent No.: US 11,561,010 B2
(45) Date of Patent: Jan. 24, 2023

(54) GAS COOKING APPLIANCE WITH TEMPERATURE-BASED POWER SUPPLY OVERLOAD PROTECTION

(71) Applicant: Midea Group Co., Ltd., Foshan (CN)

(72) Inventor: John Kenneth Hooker, Louisville, KY (US)

(73) Assignee: MIDEA GROUP CO., LTD., Guangdong (CN)

( * ) Notice: Subject to any disclaimer, the term of this patent is extended or adjusted under 35 U.S.C. 154(b) by 199 days.

(21) Appl. No.: 17/108,207

(22) Filed: Dec. 1, 2020

(65) Prior Publication Data

US 2022/0170639 A1   Jun. 2, 2022

(51) Int. Cl.
| | | |
|---|---|---|
| F24C 3/12 | (2006.01) | |
| F16K 31/04 | (2006.01) | |
| F23N 1/00 | (2006.01) | |
| F23N 5/24 | (2006.01) | |

(52) U.S. Cl.
CPC .............. *F24C 3/126* (2013.01); *F16K 31/04* (2013.01); *F23N 1/005* (2013.01); *F23N 5/245* (2013.01); *F23N 2225/14* (2020.01); *F23N 2241/08* (2020.01)

(58) Field of Classification Search
CPC .......... H05B 6/06; H05B 6/12; H05B 1/0263; H05B 1/0266; H02J 2310/14; G05B 11/10; F24H 15/148; F24H 15/156; G08B 21/0484; F23N 3/08; F23N 3/06; F23N 1/005

USPC ...... 126/273 R, 39 G, 39 BA; 219/683, 707, 219/412, 413, 398; 700/211
See application file for complete search history.

(56) References Cited

U.S. PATENT DOCUMENTS

| | | | | |
|---|---|---|---|---|
| 5,429,111 A | * | 7/1995 | Akamatsu | F23N 5/203 |
| | | | | 126/39 BA |
| 5,815,351 A | * | 9/1998 | Ashok | G06F 1/28 |
| | | | | 361/86 |
| 6,619,613 B1 | * | 9/2003 | Akamatsu | F16K 31/04 |
| | | | | 251/129.05 |
| 6,700,101 B2 | * | 3/2004 | Decesari | H05B 1/0266 |
| | | | | 219/443.1 |
| 7,041,940 B2 | * | 5/2006 | Bakanowski | F24C 7/087 |
| | | | | 219/486 |
| 7,568,908 B2 | | 8/2009 | Potter | |
| 8,307,817 B2 | | 11/2012 | Dorwarth et al. | |
| 8,659,188 B2 | * | 2/2014 | Adest | H02J 3/381 |
| | | | | 307/112 |
| 8,777,608 B2 | | 7/2014 | Wah et al. | |
| 8,918,222 B2 | * | 12/2014 | Higuchi | H02J 7/0031 |
| | | | | 700/297 |
| 8,960,234 B2 | | 2/2015 | Cadeau et al. | |

(Continued)

FOREIGN PATENT DOCUMENTS

| | | |
|---|---|---|
| CN | 201526999 U | 7/2010 |
| CN | 202018006456 U1 | 7/2020 |

(Continued)

*Primary Examiner* — David J Laux
(74) *Attorney, Agent, or Firm* — Gray Ice Higdon

(57) ABSTRACT

A cooking appliance and method control the power consumption of a plurality of electrical loads in response to an ambient temperature sensed by a temperature sensor to maintain a combined power consumption within a temperature-dependent output capability of a low voltage power supply used in the cooking appliance.

21 Claims, 11 Drawing Sheets

(56) References Cited

U.S. PATENT DOCUMENTS

| | | | |
|---|---|---|---|
| 9,132,302 B2 | 9/2015 | Luongo et al. | |
| 9,303,878 B2 * | 4/2016 | Burt | F24C 3/128 |
| 9,494,320 B2 | 11/2016 | Chian et al. | |
| 9,863,639 B2 | 1/2018 | Huang et al. | |
| 10,608,432 B2 * | 3/2020 | Neal | H02J 3/14 |
| 11,183,843 B1 * | 11/2021 | Cooper | H02J 3/32 |
| 2010/0200565 A1 * | 8/2010 | Leung | H05B 3/68 |
| | | | 219/443.1 |
| 2010/0213184 A1 * | 8/2010 | Harris | F24C 7/088 |
| | | | 219/385 |
| 2013/0213951 A1 * | 8/2013 | Boedicker | H05B 1/0263 |
| | | | 219/413 |
| 2014/0162195 A1 | 6/2014 | Lee et al. | |
| 2016/0036227 A1 * | 2/2016 | Schultz | H02J 3/007 |
| | | | 700/282 |
| 2017/0299195 A1 * | 10/2017 | Bach | H05B 1/0202 |
| 2018/0359819 A1 | 12/2018 | Cadima | |
| 2021/0172602 A1 * | 6/2021 | Billman | F23N 5/203 |

FOREIGN PATENT DOCUMENTS

| | | | | |
|---|---|---|---|---|
| DE | 102006038412 A1 * | 2/2008 | | F24C 15/104 |
| EP | 2189719 A2 | 5/2010 | | |
| WO | WO2009107897 A1 | 9/2009 | | |
| WO | WO2018072051 A1 | 4/2018 | | |

\* cited by examiner

GAS COOKING APPLIANCE WITH TEMPERATURE-BASED POWER SUPPLY OVERLOAD PROTECTION

BACKGROUND

Cooking appliances such as cooktops and ranges generally rely on a number of user controls for adjusting and controlling the output levels of various burners or cooking elements. Traditionally, many cooking appliances have relied upon rotary user controls such as control knobs, as such user controls have generally found to be relatively simple and efficient to use. For cooking elements that rely on electric power, the user controls are generally coupled to infinite switch arrangements that regulate the switching of bi-metallic switches to control the output levels of the cooking elements, and for cooking elements that rely on gas, the user controls are generally coupled to mechanical valves that vary gas flow to the cooking elements. In both cases, the user controls are effectively mechanical in nature, as mechanical couplings are used between the user controls and the components that regulate the output levels of the cooking elements. Further, simple indicia is often provided on or adjacent the user controls to indicate the on/off state and output level of each associated cooking element, which while decidedly "low tech," is still relatively easy to read and understand by most users.

More recently, some cooking appliances have employed electronic control systems to provide a more modern and full-featured user interface, and some, for example, have utilized touch screen displays and/or buttons to implement "soft" user controls to control the output levels of cooking elements. In some gas cooking appliances, for example, electromechanical valves have been used to regulate gas flow to gas cooking elements, with touch screen display-based user controls used to set desired output levels and software-based control to control the electromechanical valves to provide gas flow suitable for the user-selected output levels.

It has been found, however, these electronic control systems, and in particular, the touch screen display-based user controls often utilized in such systems, can be less intuitive than simple rotary user controls, and can present challenges in terms of enabling users to quickly ascertain the current state and output level of a particular cooking element, as well as to turn cooking elements on or off or to vary their output levels. Moreover, the operating environment within a cooking appliance is often relatively inhospitable for many electronic control systems, particularly for cooking appliances with self-cleaning ovens, as self-clean cycles often heat an oven cavity to a temperature of 500 degrees Celsius or more. Electronic control systems may therefore need to be engineered to withstand higher ambient temperatures that may be present within an appliance housing.

SUMMARY

The herein-described embodiments address these and other problems associated with the art by providing a cooking appliance and method for controlling the power consumption of a plurality of electrical loads in response to an ambient temperature sensed by a temperature sensor to maintain a combined power consumption within a temperature-dependent output capability of a low voltage power supply used in the cooking appliance.

Therefore, consistent with one aspect of the invention, a cooking appliance may include a housing including an oven cavity and a cooktop, a plurality of gas burners disposed on the cooktop, a plurality of electrical loads, the plurality of electrical loads including a plurality of electromechanical valve units, each electromechanical valve unit configured to couple a respective gas burner of the plurality of gas burners to a gas supply and to regulate an output level of the respective gas burner, a low voltage power supply disposed within the housing and subject to heat generated within the oven cavity, the low voltage power supply configured to supply power to the plurality of electrical loads and having a temperature-dependent output capability, a temperature sensor disposed proximate the low voltage power supply and configured to sense an ambient temperature proximate the low voltage power supply, and a controller coupled to the plurality of electrical loads and the temperature sensor, the controller configured to determine an output capability of the low voltage power supply based upon the ambient temperature sensed by the temperature sensor and to control the electromechanical valve unit for at least one of the plurality of gas burners to selectively reduce an output level of the at least one gas burner in response to determining that a combined power consumption of the plurality of electrical loads would exceed the determined output capability of the low voltage power supply at the ambient temperature sensed by the temperature sensor.

In some embodiments, each electromechanical valve unit includes a proportional valve, and the controller is configured to determine the combined power consumption using a sensed power consumption for each proportional valve. Also, in some embodiments, each proportional valve is a current controlled proportional valve, and the controller is configured to determine the sensed power consumption for each proportional valve by sensing a current for each proportional valve. Further, in some embodiments, each electromechanical valve unit further includes a stepper valve in series with the proportional valve thereof.

In some embodiments, the plurality of electrical loads further includes a plurality of rotary burner controls, each rotary burner control configured to receive user input directed to a respective gas burner of the plurality of gas burners, and the controller is configured to determine the combined power consumption of the plurality of electrical loads using power consumption determined for each of the plurality of rotary burner controls.

In addition, in some embodiments, the plurality of electrical loads further includes one or more user interfaces configured to display status information for the plurality of gas burners, and the controller is configured to determine the combined power consumption of the plurality of electrical loads using power consumption determined for the one or more user interfaces. In some embodiments, the one or more user interfaces includes a plurality of electronic burner control user interfaces, each electronic burner control user interface dedicated to a respective rotary burner control of the plurality of rotary burner controls and to a respective gas burner of the plurality of gas burners to display status information for the respective gas burner. In addition, in some embodiments, each electronic burner control user interface is positioned on or adjacent to a rotary control actuator of the respective rotary burner control. Moreover, in some embodiments, each electronic burner control user interface includes a multi-segment, multi-digit LED display and includes a plurality of LED segment inputs and a plurality LED digit inputs, and the controller is configured to determine a power consumption for each electronic burner control user interface based on a number of segments being illuminated thereby.

Some embodiments may also include a plurality of igniters, each igniter positioned adjacent a respective gas burner of the plurality of gas burners, the plurality of electrical loads further includes a plurality of igniter relays, each igniter relay configured to drive a respective igniter of the plurality of igniters, and the controller is configured to determine the combined power consumption of the plurality of electrical loads using power consumption determined for each of the plurality of igniter relays. In some embodiments, the controller is configured to determine the combined power consumption of the plurality of electrical loads further using a power consumption determined for the controller itself.

Moreover, in some embodiments, the controller is configured to receive user input that requests an increase in output level of a first gas burner of the plurality of gas burners, and to deny the request to increase the output level of the first gas burner in response to determining that the combined power consumption of the plurality of electrical loads after increasing the output level of the first gas burner would exceed the determined output capability of the low voltage power supply at the ambient temperature sensed by the temperature sensor. In some embodiments, the controller is configured to receive user input that requests an increase in output level of a first gas burner of the plurality of gas burners to a first output level, and to increase the output level of the first gas burner to a second output level that is lower than the first output level in response to determining that the combined power consumption of the plurality of electrical loads after increasing the output level of the first gas burner to the first output level would exceed the determined output capability of the low voltage power supply at the ambient temperature sensed by the temperature sensor. In addition, in some embodiments, the controller is configured to receive user input that requests an increase in output level of a first gas burner of the plurality of gas burners, and to lower the output level of a second gas burner of the plurality of gas burners in response to determining that the combined power consumption of the plurality of electrical loads after increasing the output level of the first gas burner would exceed the determined output capability of the low voltage power supply at the ambient temperature sensed by the temperature sensor.

In some embodiments, the controller is configured to set an output level of a first gas burner of the plurality of gas burners to a first output level in response to user input, and in response to an increase in ambient temperature sensed by the temperature sensor after the first gas burner is set to the first output level, decrease the output level of the first gas burner to a second output level that is lower than the first output level in response to determining that the combined power consumption of the plurality of electrical loads would exceed the determined output capability of the low voltage power supply at the increased ambient temperature sensed by the temperature sensor. Moreover, in some embodiments, the controller is configured to select the first gas burner for a decrease in output level in response to the increased ambient temperature sensed by the temperature sensor based upon the output level of the first gas burner being most recently changed in response to user input.

Also, in some embodiments, the oven cavity includes one or more oven cooking elements, and the controller is configured to operate the one or more oven cooking elements to perform a self-clean cycle, and to selectively reduce the output level of the at least one gas burner in response to determining that the combined power consumption of the plurality of electrical loads would exceed the determined output capability of the low voltage power supply at the ambient temperature sensed by the temperature sensor during the self-clean cycle. In some embodiments, the controller is further configured to generate a user alert in connection with selectively reducing the output level of the at least one gas burner.

Consistent with another aspect of the invention, a cooking appliance may include a housing, one or more cooking elements, a plurality of electrical loads, a low voltage power supply disposed within the housing and configured to supply power to the plurality of electrical loads, the low voltage power supply having a temperature-dependent output capability, a temperature sensor disposed proximate the low voltage power supply and configured to sense an ambient temperature proximate the low voltage power supply, and a controller coupled to the plurality of electrical loads and the temperature sensor, the controller configured to determine an output capability of the low voltage power supply based upon the ambient temperature sensed by the temperature sensor and to selectively reduce a power consumption of at least one of the plurality of electrical loads in response to determining that a combined power consumption of the plurality of electrical loads would exceed the determined output capability of the low voltage power supply at the ambient temperature sensed by the temperature sensor.

In addition, in some embodiments, each cooking element includes a gas burner, the plurality of electrical loads includes a plurality of electromechanical valve units, each electromechanical valve unit configured to couple a respective gas burner of the plurality of cooking elements to a gas supply and to regulate an output level of the respective gas burner, and the controller is configured to selectively reduce the power consumption of at least one of the plurality of electrical loads by controlling the electromechanical valve unit for at least one gas burner to selectively reduce an output level thereof.

Consistent with another aspect of the invention, a method of operating a cooking appliance may include operating a plurality of cooking elements, including powering a plurality of electrical loads with a low voltage power supply, the low voltage power supply having a temperature-dependent output capability, sensing an ambient temperature proximate the low voltage power supply using a temperature sensor, determining an output capability of the low voltage power supply based upon the ambient temperature sensed by the temperature sensor, and selectively reducing a power consumption of at least one of the plurality of electrical loads in response to determining that a combined power consumption of the plurality of electrical loads would exceed the determined output capability of the low voltage power supply at the ambient temperature sensed by the temperature sensor.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

In the embodiments discussed hereinafter, a gas cooking appliance may utilize an electronic control system to control various gas burners in the cooking appliance. In some embodiments, the electronic control system may be used to control electromechanical valve units with rotary burner controls, while in other embodiments, the electronic control system may be used to implement temperature-based power supply overload protection. In some embodiments, an electronic control system may implement both features, although each feature may be implemented alone in other embodiments.

Figure 1:
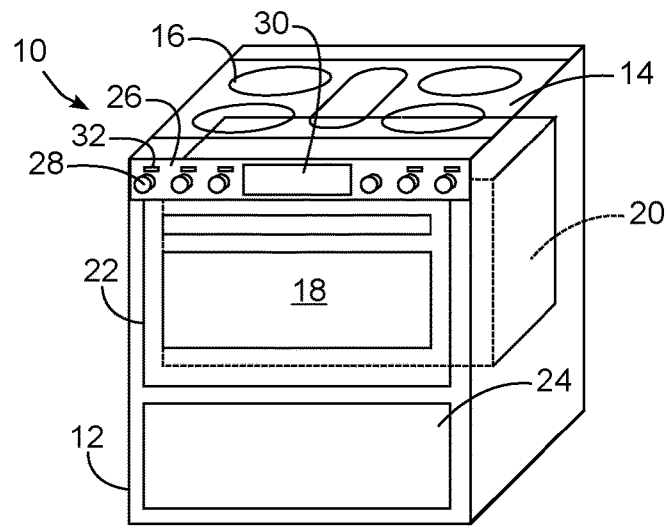
FIG. 1 is a perspective view of a cooking appliance consistent with some embodiments of the invention.

Turning now to the drawings, wherein like numbers denote like parts throughout the several views, FIG. 1 illustrates an example cooking appliance 10 in which the various technologies and techniques described herein may be implemented. Cooking appliance 10 is a residential-type range, and as such includes a housing 12, a stovetop or cooktop 14 including a plurality of burners 16, and an oven 18 defining an oven or cooking cavity 20 accessed via an oven door 22. Cooking appliance 10 may also include a storage drawer 24 in some embodiments, or in other embodiments, may include a second oven. Various cooking elements (not shown in FIG. 1) may also be incorporated into cooking appliance 10 for cooking food in oven 18, e.g., one or more electric or gas heating elements.

Cooking appliance 10 may also include various user interface devices, including, for example, a control panel 26 incorporating a plurality of rotary burner controls 28 and a user interface or display 30 for providing visual feedback as to the activation state of the cooking appliance. As will become more apparent below, in some embodiments, each rotary burner control 28 may include an associated electronic burner control user interface or display 32 that is disposed on or adjacent to a knob or rotary control actuator of the rotary burner control 28. It will be appreciated that cooking appliance 10 may include various types of user controls in other embodiments, including various combinations of switches, buttons, knobs and/or sliders, typically disposed at the rear or front (or both) of the cooking appliance. Further, in some embodiments, one or more touch screens may be employed for interaction with a user. As such, in some embodiments, display 30 may be touch sensitive to receive user input in addition to displaying status information and/or otherwise interacting with a user. In still other embodiments, cooking appliance 10 may be controllable remotely, e.g., via a smartphone, tablet, personal digital assistant or other networked computing device, e.g., using a web interface or a dedicated app. In some embodiments, both the cooktop burners and the oven may be controlled by the same electronic control system, while in other embodiments, different control systems may be used for separate control of each system.

Each of user interfaces/displays 30, 32 may also vary in different embodiments, and may include individual indicators, segmented alphanumeric displays, and/or dot matrix displays, and may be based on various types of display technologies, including LEDs, vacuum fluorescent displays, incandescent lights, etc. Further, in some embodiments audio feedback may be provided to a user via one or more speakers, and in some embodiments, user input may be received via a spoken or gesture-based interface.

As noted above, cooking appliance 10 of FIG. 1 is a range, which combines both a stovetop and one or more ovens, and which in some embodiments may be a standalone or drop-in type of range. In other embodiments, however, cooking appliance 10 may be another type of cooking appliance, e.g., a cooktop, stovetop or hob lacking an integrated oven. In general, a cooking appliance consistent with the invention may be considered to include any residential-type appliance including a housing and one or more cooking elements disposed therein and configured to generate energy for cooking food.

In turn, a cooking element may be considered to include practically any type of energy-producing element used in residential applications in connection with cooking food, e.g., employing various cooking technologies such as electric, gas, light, microwaves, induction, convection, radiation, etc. In the case of an oven, for example, one or more cooking elements therein may be gas, electric, light, or microwave heating elements in some embodiments, while in the case of a cooktop, one or more cooking elements therein may be gas, electric, or inductive heating elements in some embodiments. Further, it will be appreciated that any number of cooking elements may be provided in a cooking appliance (including multiple cooking elements for performing different types of cooking cycles such as baking or broiling), and that multiple types of cooking elements may be combined in some embodiments, e.g., combinations of microwave and light cooking elements in some oven embodiments. In the case of the embodiments discussed hereinafter, at least one of the cooking elements for the cooktop includes a gas burner and an electromechanical valve unit that couples the gas burner to a gas supply.

Figure 2:
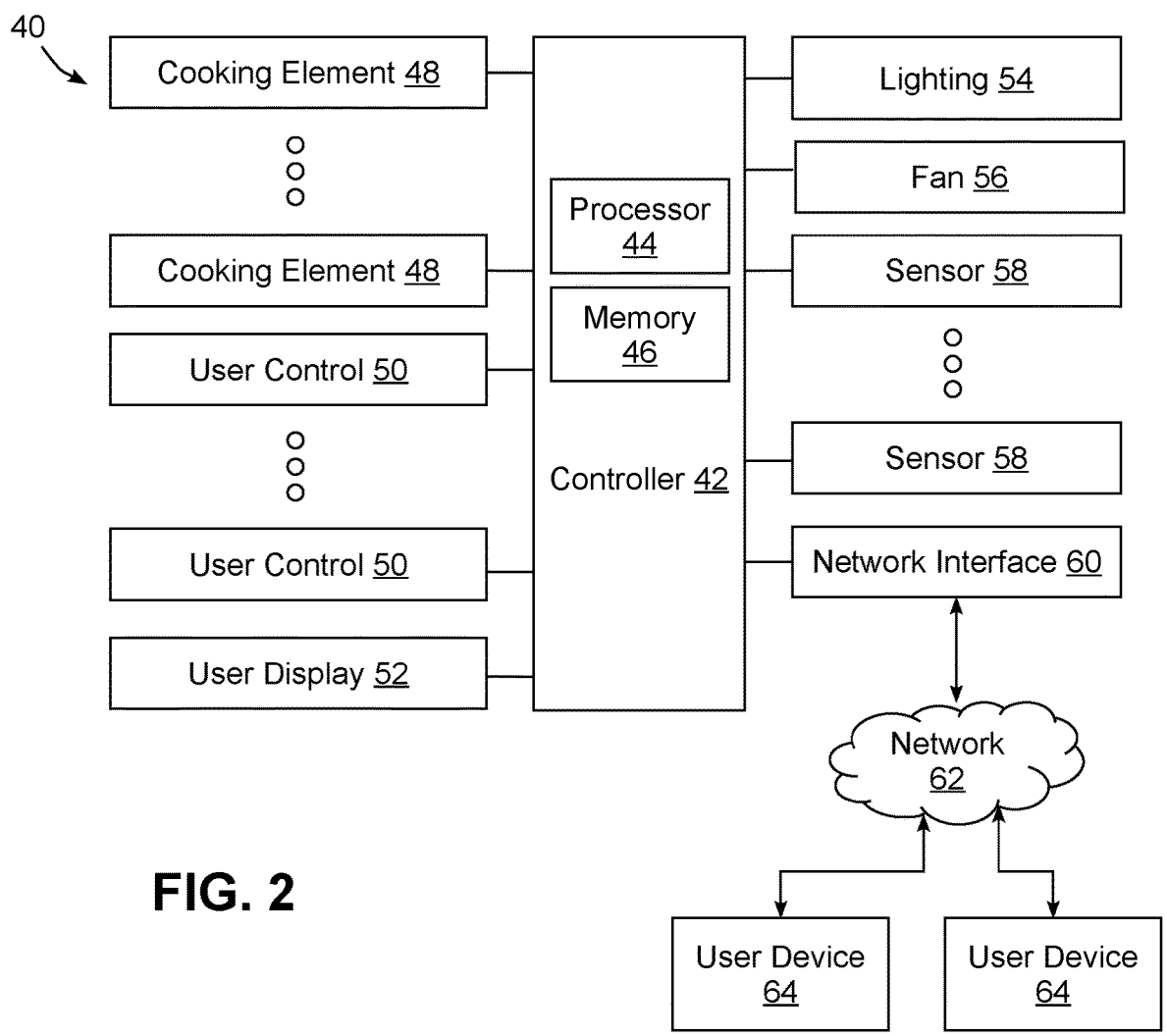
FIG. 2 is a block diagram of an example control system for a cooking appliance consistent with some embodiments of the invention.

A cooking appliance consistent with the invention also generally includes one or more controllers configured to control the cooking elements and otherwise perform cooking operations at the direction of a user. FIG. 2, for example, illustrates an example embodiment of a cooking appliance 40 including a controller 42 that receives inputs from a number of components and drives a number of components in response thereto. Controller 42 may, for example, include one or more processors 44 and a memory 46 within which may be stored program code for execution by the one or more processors. The memory may be embedded in controller 42, but may also be considered to include volatile and/or non-volatile memories, cache memories, flash memories, programmable read-only memories, read-only memories, etc., as well as memory storage physically located elsewhere from controller 42, e.g., in a mass storage device or on a remote computer interfaced with controller 42.

As shown in FIG. 2, controller 42 may be interfaced with various components, including various cooking elements 48 used for cooking food (e.g., various combinations of gas, electric, inductive, light, microwave, light cooking elements, among others), one or more user controls 50 for receiving user input (e.g., various combinations of switches, knobs, buttons, sliders, touchscreens or touch-sensitive displays, microphones or audio input devices, image capture devices, etc.), and a user display 52 (including various indicators, graphical displays, textual displays, speakers, etc.), as well as various additional components suitable for use in a cooking appliance, e.g., lighting 54 and/or one or more fans 56 (e.g., convection fans, cooling fans, etc.), among others.

Controller 42 may also be interfaced with various sensors 58 located to sense environmental conditions inside of and/or external to cooking appliance 40, e.g., one or more temperature sensors, humidity sensors, air quality sensors, smoke sensors, carbon monoxide sensors, odor sensors and/or electronic nose sensors, among others. Such sensors may be internal or external to cooking appliance 40, and may be coupled wirelessly to controller 42 in some embodiments. Sensors 58 may include, for example, one or more temperature sensors for sensing an ambient air temperature proximate a low voltage power supply, as discussed in greater detail below.

In some embodiments, controller 42 may also be coupled to one or more network interfaces 60, e.g., for interfacing with external devices via wired and/or wireless networks such as Ethernet, Wi-Fi, Bluetooth, NFC, cellular and other suitable networks, collectively represented in FIG. 2 at 62. Network 62 may incorporate in some embodiments a home automation network, and various communication protocols may be supported, including various types of home automation communication protocols. In other embodiments, other wireless protocols, e.g., Wi-Fi or Bluetooth, may be used. In some embodiments, cooking appliance 40 may be interfaced with one or more user devices 64 over network 62, e.g., computers, tablets, smart phones, wearable devices, etc., and through which cooking appliance 40 may be controlled and/or cooking appliance 40 may provide user feedback.

In some embodiments, controller 42 may operate under the control of an operating system and may execute or otherwise rely upon various computer software applications, components, programs, objects, modules, data structures, etc. In addition, controller 42 may also incorporate hardware logic to implement some or all of the functionality disclosed herein. Further, in some embodiments, the sequences of operations performed by controller 42 to implement the embodiments disclosed herein may be implemented using program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the invention applies equally regardless of the particular type of computer readable media used to actually carry out the distribution, including, for example, non-transitory computer readable storage media. In addition, it will be appreciated that the various operations described herein may be combined, split, reordered, reversed, varied, omitted, parallelized and/or supplemented with other techniques known in the art, and therefore, the invention is not limited to the particular sequences of operations described herein.

Numerous variations and modifications to the cooking appliances illustrated in FIGS. 1-2 will be apparent to one of ordinary skill in the art, as will become apparent from the description below. Therefore, the invention is not limited to the specific implementations discussed herein.

Figure 3:
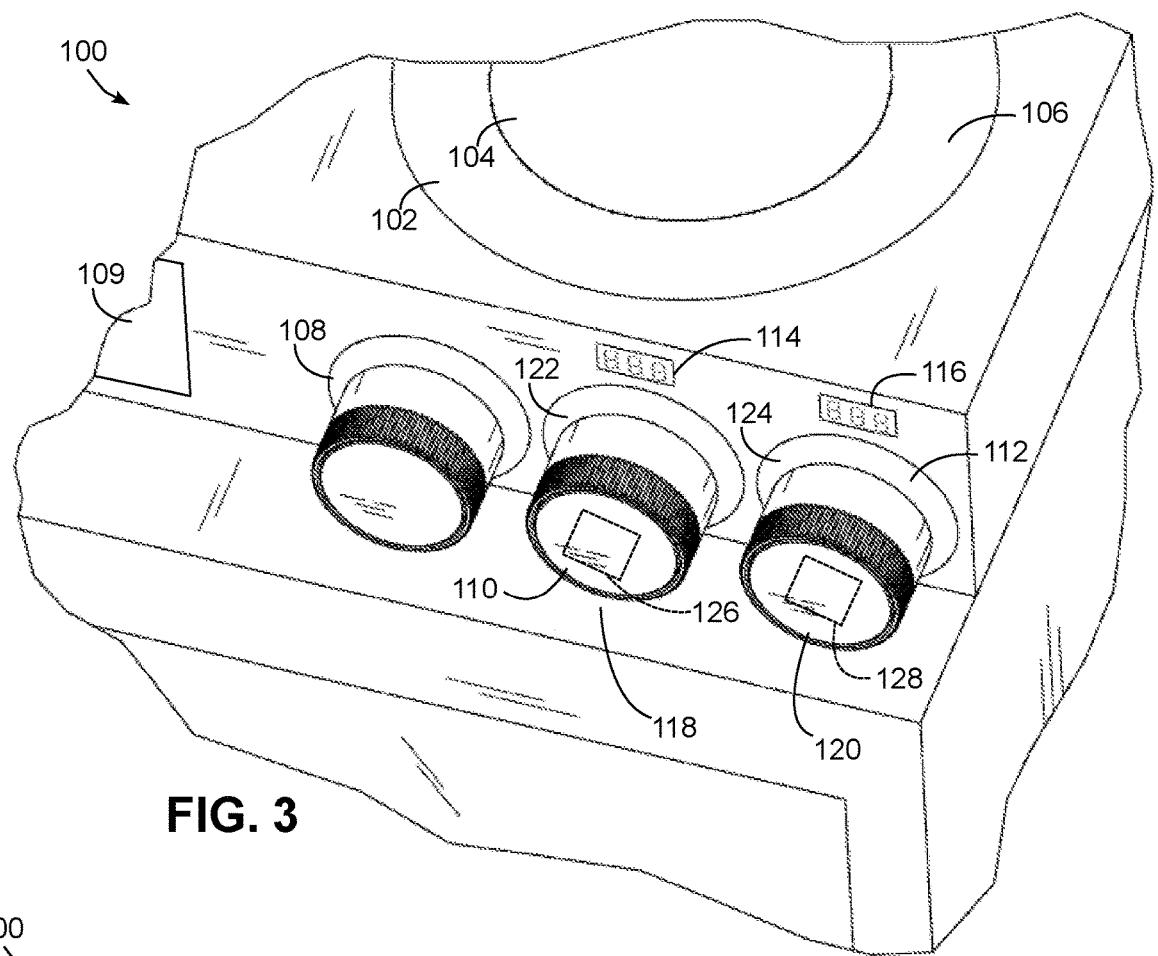
FIG. 3 is a partial perspective view of a cooking appliance implementing rotary burner control of electromechanical valve units consistent with some embodiments of the invention.

Electronic Control System for Gas Burner Incorporating Electromechanical Valve Unit and Rotary Burner Control Now turning to FIG. 3, it may be desirable in some embodiments to utilize an electronic control system utilizing both electromechanical valve units and rotary burner controls to control the operation of various gas burners on a cooktop. FIG. 3, in particular, illustrates a cooking appliance 100 including a gas cooktop burner 102, which is implemented in this instance as a dual burner including inner and outer burner elements 104, 106. It will be appreciated that a gas burner may be implemented in some embodiments as a single burner including a single burner element, or in other embodiments, using more than two burner elements. It will also be appreciated that a gas cooktop may include multiple gas burners having different sizes, shapes, output levels and/or combinations of burner elements.

Cooking appliance 100 is a range, and as such, may include an oven that is controlled through a separate user interface from the cooktop, e.g., using a rotary control 108 and a display 109, or using other control interfaces as will be appreciated by those of ordinary skill having the benefit of the instant disclosure. In other embodiments, oven control may also be integrated with cooktop control, and in still other embodiments, e.g., cooktops with six or more gas burners, rotary control 108 may be used to control a gas cooktop burner rather than controlling an oven.

Cooktop control in cooking appliance 100 is primary provided by a set of rotary burner controls, with one rotary burner control utilized for each gas cooktop burner. In FIG. 3, for example, two such rotary burner controls are illustrated at 110 and 112, and each rotary burner control includes an electronic burner control user interface or display 114, 116, a rotary control actuator 118, 120, an illumination source 122, 124 (e.g., an LED-backlit ring) and a secondary control 126, 128, e.g., a switch or touch sensor configured to detect an axial force applied to the rotary control actuator 118, 120 and generate an actuation signal in response thereto, e.g., for turning a gas burner on or off or performing other user inputs, as will be discussed in greater detail below.

Figure 4:
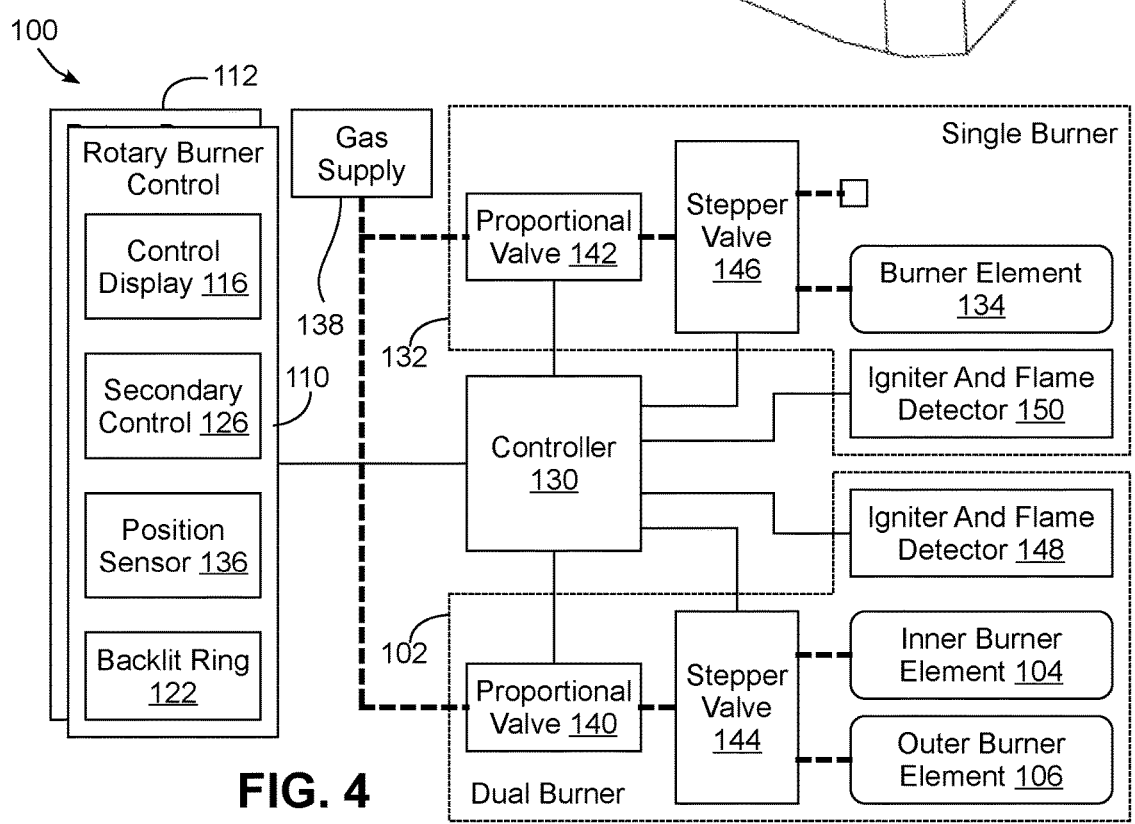
FIG. 4 is a block diagram of an example electronic control system for the cooking appliance of FIG. 3.

With further reference to FIG. 4, control over the gas cooktop burners of cooking appliance 100 may be provided by a controller 130, which is illustrated in FIG. 4 as being interfaced with rotary burner controls 110, 112 and dual burner 102, as well as an additional single burner 132 including a single burner element 134. Additional rotary burner controls and burners are omitted from FIG. 4 to simplify the illustration, although it will be appreciated that any number of burners and associated rotary burner controls, e.g., supporting 3, 4, 5, 6, 7 or more burners, may be used in other embodiments.

As noted above, each rotary burner control, e.g., rotary burner control 110, generally includes, in addition to a rotary control actuator, an electronic burner control user interface or display 116, backlit ring 122, and secondary control 126. In addition, each rotary burner control may also include a position sensor 136, which in the illustrated embodiment is implemented as an encoder such as an A-quad-B encoder.

A rotary control actuator in some embodiments may be a rotatable knob such as illustrated at 118, 120 in FIG. 3. In other embodiments, however, a rotary control actuator may be implemented using other rotary controls, e.g., a ring or wheel. In the illustrated embodiment, the rotatable knob may be a continuous rotatable knob that is infinitely rotatable in both directions, while in other embodiments the knob may be rotatable only within a limited range.

An electronic burner control user interface or display may also be implemented in a number of manners in different embodiments. In the illustrated embodiment, for example, each electronic burner control user interface or display is implemented using a multi-segment, multi-digit LED display, e.g., including three 7-segment digits and various supplemental indicators representing a fourth digit, which is positioned adjacent the rotary control actuator on a front face of the appliance. In other embodiments, however, such a user interface or display may be positioned in other locations adjacent the rotary control actuator, or even on the rotary control actuator itself. In some embodiments, e.g., where a rotary control actuator is a ring or wheel, such a user interface or display may be positioned on a stationary front or side surface proximate or on the rotary control actuator. In addition, the user interface or display is generally dedicated to a particular burner and rotary burner control such that the user interface or display only displays status information related to that burner and rotary burner control, e.g., a current output level of the burner (e.g., a numerical value or label such as 0-10, a percent, a descriptor such as "low," "medium," or "high,", etc.). In other embodiments, however, other user interface technologies may be used, e.g., using dot-matrix panels, LED or LCD panels, vacuum fluorescent displays, discrete illumination sources, etc. Furthermore, user interfaces or displays may support multiple burners and rotary burner controls in some embodiments, e.g., to display status information for multiple burners having closely-positioned rotary burner controls (e.g., one display for rotary burner controls 110, 112 of FIG. 3). In still other embodiments, a single user interface or display may be used for all gas cooktop burners.

Each backlit ring 122 may be implemented using one or more LED indicators that illuminate various portions of the rotary burner control, and that in some embodiments may also convey additional status information, e.g., a rotary position indicator, a color or animation representing on/off status, hot burner status, etc. In other embodiments, no illumination may be supported, so backlit ring 122 may be omitted.

Each secondary control 126 may be used to provide a secondary source of user input to supplement the rotational input received via rotation of the rotary control actuator, e.g., to activate or deactivate the gas burner, to ignite the gas burner, or provide other user input. The secondary control 126 may be implemented using a touch sensor, a mechanical or magnetic switch on the rotary control actuator, a mechanical or magnetic switch capable sensing axial movement of the rotary control actuator itself, or any other sensor capable of sensing an axial force applied generally along the axis of rotation of the rotary control actuator. In other embodiments, a secondary control may be implemented separately from a rotary control actuator (e.g., adjacent thereto on the control panel) or may be omitted entirely.

Each position sensor 136 may be implemented using practically any type of sensor capable of detecting an absolute position and/or relative movement of the rotary control actuator, e.g., an encoder, one or more microswitches, etc. In one embodiment, an A-quad-B encoder may be used to indicate both a direction and extent of relative rotation of the rotary control actuator.

Each burner 102, 132 is coupled to a gas supply 138 through an electromechanical valve unit, which in the illustrated embodiment includes a proportional valve 140, 142 in series with a stepper valve 144, 146, as illustrated in FIG. 4. Each proportional valve 142 may be implemented, for example, as a normally-closed current controlled proportional valve such that the gas flow through the valve is variable based upon the driving current, and in the absence of a driving current the valve returns to a closed position. Each stepper valve 144, 146 may be implemented as a unipolar stepper motor valve having two outputs and a valve body that is by rotatable by a stepper motor between three positions: a first position in which the stepper valve is closed, a second position in which one of the two outputs is open, and a third position in which both of the outputs are open (which may be offset by 90 degrees each in some embodiments). For a dual burner such as burner 102, the two outputs of stepper valve 144 may be coupled to the two burner elements 104, 106 such that the stepper valve can either provide a flow of gas to the inner burner element 104 alone or to both burner elements 104, 106, depending upon the output level desired. For single burner 132, the single burner element 134 may be coupled to one of the outputs of stepper valve 146, while the other is blocked off, thereby enabling the same valve design to be used for both single and dual burners. In other embodiments, however, different valve arrangements may be used in an electromechanical valve unit, e.g., a single proportional valve, a single stepper motor driven proportional valve, a parallel arrangement of discrete on/off valves having differing flow rates, or other valve designs and/or combinations of valves as will be appreciated by those of ordinary skill having the benefit of the instant disclosure.

Each burner 102, 132 may also include an associated igniter and flame detector 148, 150 positioned proximate thereto. In some embodiments, the igniter and flame detector may be coupled to a gas re-igniter module that both ignites the burner on startup and also detects and attempts to reignite the burner in response to a flame loss while gas is being supplied to the burner. In other embodiments, however, no automatic re-ignition functionality may be supported.

Figure 5:
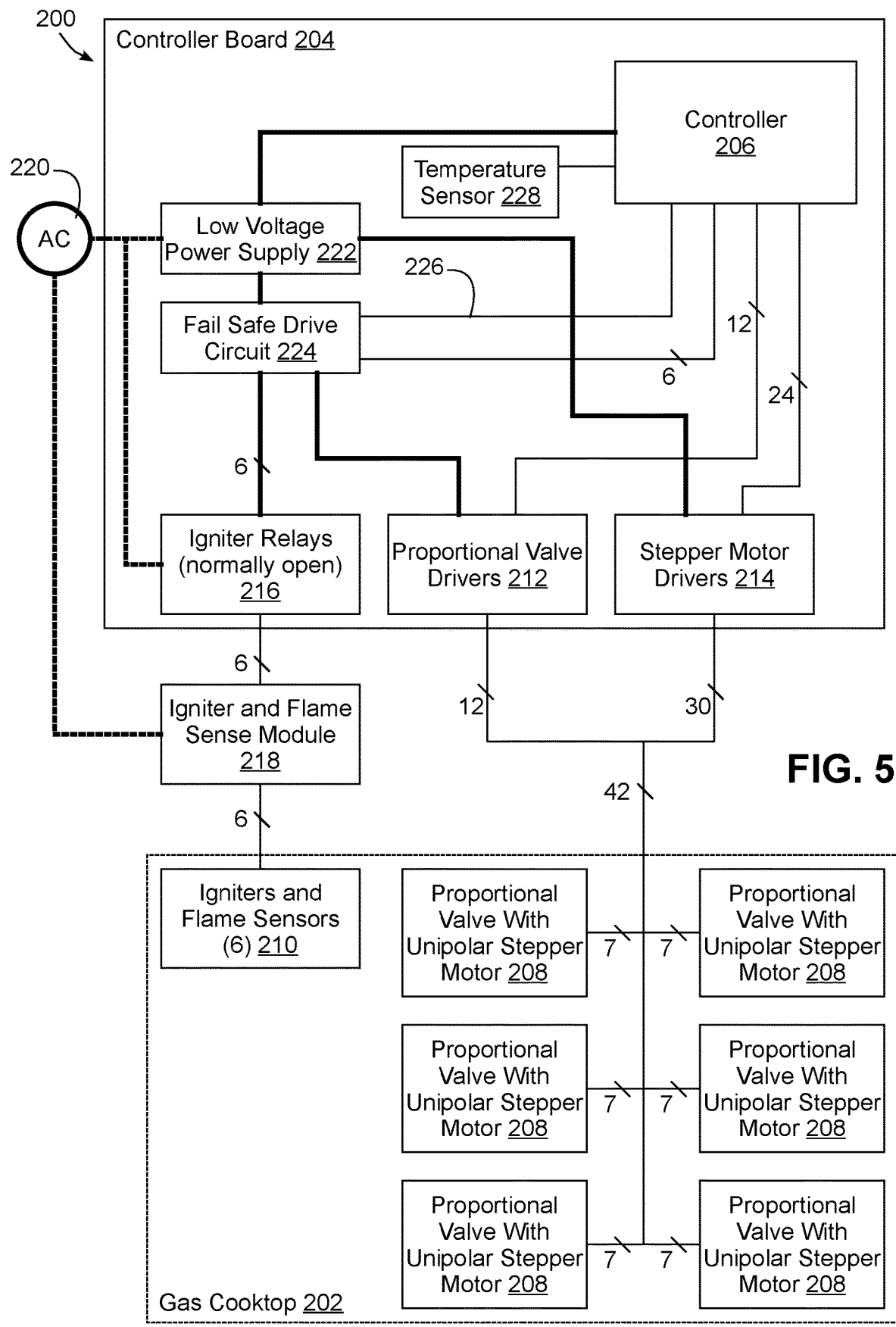
FIGS. 5-6 are block diagrams of another example electronic control system for implementing rotary burner control of electromechanical valve units consistent with some embodiments of the invention.
Figure 6:
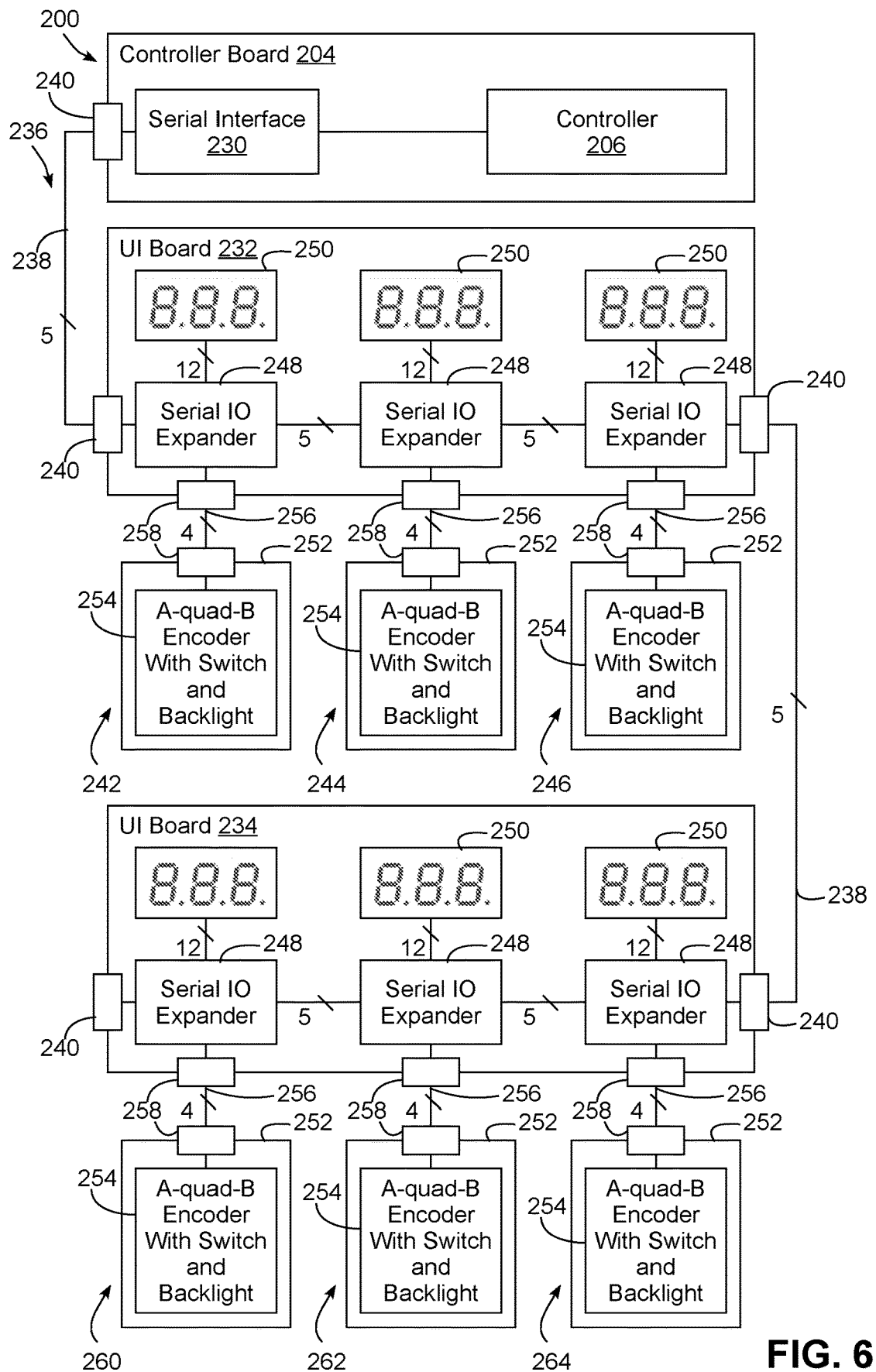

Now turning to FIGS. 5-6, a control circuit 200 suitable for use in a gas cooktop burner electronic control system consistent with the invention is illustrated in greater detail. In this design, six gas cooktop burners are supported, although greater or few burners may be used in other embodiments. FIG. 5 illustrates the interconnection of a gas cooktop 202 to a controller board 204, while FIG. 6 illustrates the interconnection of the controller board 204 to a plurality of rotary burner controls 242, 244, 246, 260, 262, 264. A controller 206 is disposed on controller board 204 and is configured to control a set of electromechanical valve units, each implemented in this embodiment as a proportional valve with a unipolar stepper motor 208. In addition, a set of igniters and flame sensors 210 are provided in proximity to the burners. Control over the electromechanical valve units is provided by a set of proportional valve drivers 212 and a set of stepper motor drivers 214, and igniters/flame sensors are controlled using a set of igniter relays 216 coupled to an igniter and flame sense module 218, e.g., an E.G.O. RI-305 or RI-306 gas re-igniter with flame rectification or similar module, which is capable of providing a spark until a flame is sensed at an igniter, and re-spark if the flame is extinguished as long as an AC signal is supplied, such that an igniter may be disabled by deactivating the associated igniter relay 216.

Six pins on controller 206 may be used to provide individual igniter enable signals to the relays for the six igniters, while 12 pins on controller 206 may be used to provide a drive current to each of the six proportional valve drive circuits and receive a current feedback signal therefrom. 24 pins on controller 206 are used to interface with the stepper motor drivers 214 (4 pins per stepper motor driver), resulting in a total of 42 wires, two for each proportional valve and five for each stepper motor, being provided to electromechanical valve units 208 on the cooktop.

Both igniter relays 216 and module 218 are powered by an AC power source 220, while other components on controller board 204 are powered by DC power, e.g., as provided by one or more low voltage power supplies 222. In the illustrated embodiment, low voltage power supply 222 is a 24 VDC power supply rated at 30 W and providing 24 VDC, 12 VDC and 5 VDC outputs to supply various components on the controller board, as well as to power both the electromechanical valve units and the rotary burner controls. A low voltage power supply, in this regard, may be considered to be a power supply that outputs about 30 VAC or lower or about 50 VDC or lower, as will be appreciated by those of ordinary skill having the benefit of the instant disclosure.

While controller 206 and stepper motor drivers 214 are directly powered by power supply 222, proportional valve drivers 212 and igniter relays 216 are powered through a fail-safe drive circuit 224, which is controlled by controller 206 and is configured to disable power to each of drivers 212 and relays 216 in response to absence of a heartbeat signal provided by controller 206 over line 226, as will be discussed in greater detail below in connection with FIG. 7. Further, a temperature sensor 228 is disposed on control board 204 proximate to low voltage power supply 222, and is used to sense the ambient temperature around the low voltage power supply in connection with temperature-based power supply overload protection, which is discussed in greater detail below in connection with FIGS. 11-12.

Now turning to FIG. 6, this figure illustrates the interconnection of the controller board 204 to a plurality of rotary burner controls 242, 244, 246, 260, 262, 264. It will be appreciated that controller board 204 may be disposed, for example, within the housing of the cooking appliance, and may, due to space and heat requirements, be positioned remotely from the rotary burner controls that are typically disposed on a front panel of the appliance, e.g., towards a rear of the appliance. Thus, in order to facilitate communication between the controller 206 and the rotary burner controls, a serial interface controller 230 may be provided on controller board 204 to communicate with one or more user interface boards (e.g., user interface boards 232, 234) over a serial interface 236.

In the illustrated embodiment, boards 204, 232 and 234 are daisy chained together using cables 238 connected via connectors 240. Serial interface 236 implements an I2C (Inter-Integrated Circuit) serial interface in the illustrated embodiment, such that each cable 238 and connector 240 requires only 5 wires and pins, which effectively enables all rotary burner controls to be interfaced with the controller board 204 through a single 5-wire cable extending from the front of the appliance to the rear. It will be appreciated that other serial interface protocols may be used in other embodiments.

As noted above, six rotary burner controls 242, 244, 246, 260, 262, 264 are disposed on two user interface boards 232, 234, which may be positioned, for example, on front left and front right sides of the front control panel of the appliance. Each user interface board 232, 234 may support three rotary burner controls, although in other embodiments, each rotary burner control may have a separate user interface board that is daisy chained in the serial interface 236. Each user interface board 232, 234 includes, for each rotary burner control, a serial input/output (IO) expander 248 that drives a multi-segment, multi-digit LED display 250 and that interfaces with a rotary control actuator 252 including an integrated A-quad-B encoder, secondary control/switch, and backlight/illumination source 254 via a cable 256 and connectors 258.

In the illustrated embodiment, serial IO expander 248 may be implemented using a PCF8575 or PCA8575 16-bit IO expander or other suitable component, and may be configured to convert between parallel data supplied over 16 pins and used by a rotary burner control, and serial data communicated over serial interface 236. 12 of the 16 pins may be used to drive display 250, with 8 of the pins used for LED segment inputs and 4 of the pins used for LED digit inputs, thereby enabling the controller 206 to address individual segments in individual digits in the display using serial data communicated over the serial interface, e.g., by sequentially driving the segments of each digit using the associated LED segment and digit inputs using interleaved serial packets. The remaining 4 pins are used to communicate A and B outputs of the A-quad-B encoder, communicate the actuation signal from the secondary control, and drive the illumination source. Each serial IO expander may be assigned a unique address among 8 addresses supported by three address lines on the serial IO expander chip.

In the illustrated embodiment, an interrupt-driven approach may be used to communicate encoder and secondary control signals to the controller. With such an approach, a serial IO expander 248 may generate an interrupt signal whenever the secondary control is actuated or the encoder senses rotation of the rotary control actuator. When controller 206 receives the interrupt signal, the controller may commence to read the encoder inputs from each of the serial I/O expanders until the interrupt signal is cleared. The controller may keep track of the state of each rotary control actuator in software (e.g., as described below in connection with FIG. 9) and may continually update each of the displays 250 using an appropriate multiplexing scheme used for driving high segment count displays.

Figure 7:
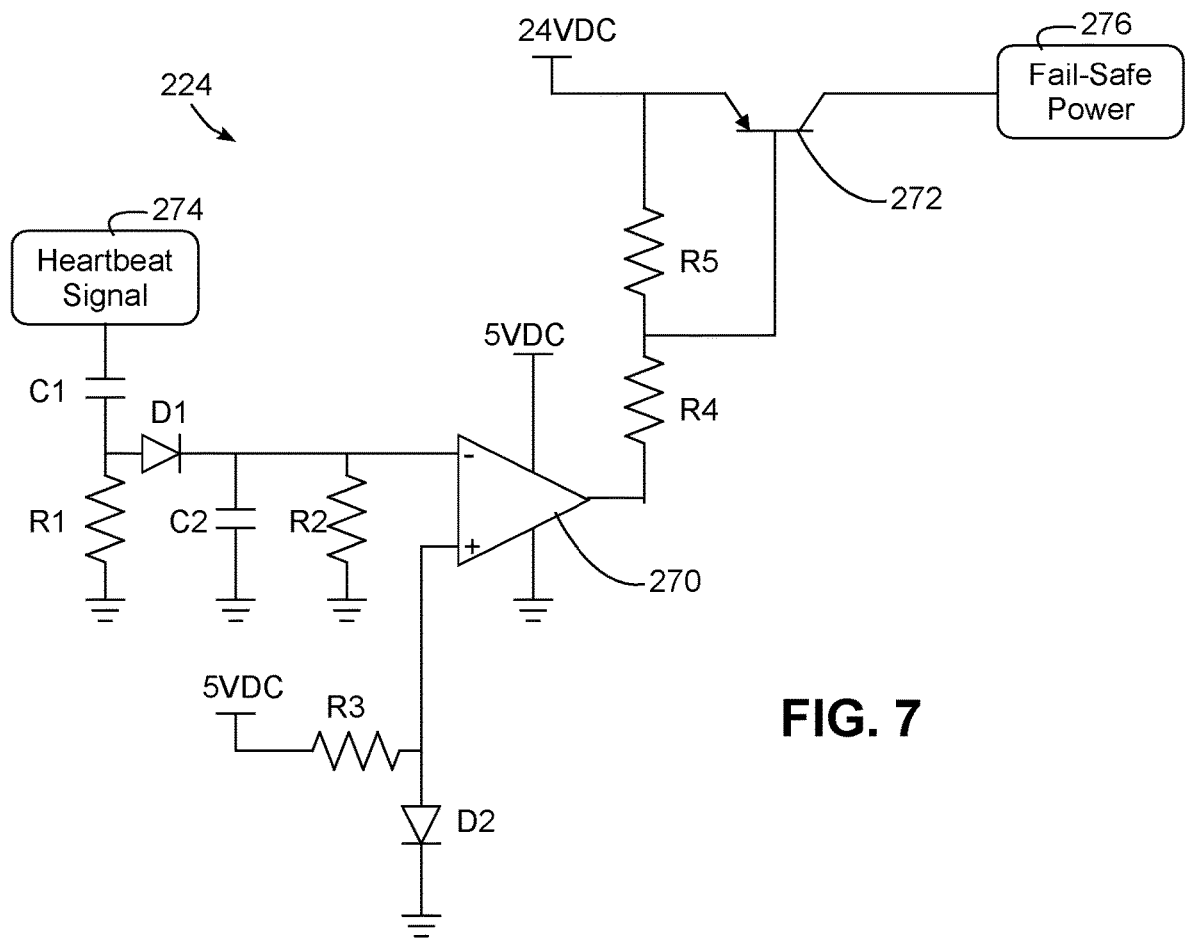
FIG. 7 is a circuit diagram of an example implementation of the fail-safe drive circuit referenced in FIG. 5.

Now turning to FIG. 7, as noted above fail-safe drive circuit 224 may be used to provide a fail-safe drive voltage to each proportional valve driver 212 and igniter relay 216, such that disabling the fail-safe drive voltage will deactivate each proportional valve driver 212 and igniter relay 216, thereby automatically closing the associated normally-closed proportional valve and normally-open igniter relay. A heartbeat signal 274 may be provided by controller 206, and circuit 224 may output an appropriate fail-safe power signal 276 in response to a valid heartbeat signal, but disable the fail-safe power signal in the absence of a valid heartbeat signal.

In the illustrated embodiment, the heartbeat signal is an oscillatory signal (e.g., having a frequency of about 500 Hz, and the fail-safe drive circuit is configured as a capacitively coupled drive circuit that is configured to disable the drive voltage in response to a frequency of the heartbeat signal falling below some threshold frequency. The anode of a diode D1 is coupled to heartbeat signal 274 through a capacitor C1 and to ground through a resistor R1, and the cathode of diode D1 is coupled to a negative input of a differential comparator 270 (e.g., an LM339 comparator) and is coupled to ground through a parallel arrangement of capacitor C2 and resistor R2. The positive input of differential comparator 270 is coupled to ground through diode D2 and coupled to 5 VDC power supplied by low voltage power supply 222 through a resistor R3.

The fail-safe power output 276 is coupled to the collector of a PNP BJT transistor (e.g., an MMBT4403 transistor) 272 while the emitter of transistor 272 is coupled to 24 VDC power supplied by low voltage power supply 222. The base of transistor 272 is coupled to the output of differential comparator 270 through a resistor R4 and to the emitter through a resistor R5. The values of the resistors and capacitors are selected such that a heartbeat signal having a predetermined frequency is required to activate transistor 272 to supply current to fail-safe power output 276, and the absence of a heartbeat signal will deactivate transistor 272 and thereby disable the power output.

From the perspective of controller 206, the controller may include, among its other tasks associated with controlling the gas cooktop, the generation of the appropriate heartbeat signal, such that any hardware or software failure in the controller that inhibits generation of the heartbeat signal will cause the fail-safe drive circuit to disable the drive voltage and thereby disable both the igniters and the proportional valves. In some embodiments, controller 206 may also include further fail-safe functionality, including removing power from user interface boards 232, 234 in order to reset the serial IO expander chips in case they stop responding. Further, a watchdog circuit in the controller may also be configured to reset the controller if it times out, and the reset process may also include functionality to automatically drive each of the stepper valves to a home position.

Figure 8:
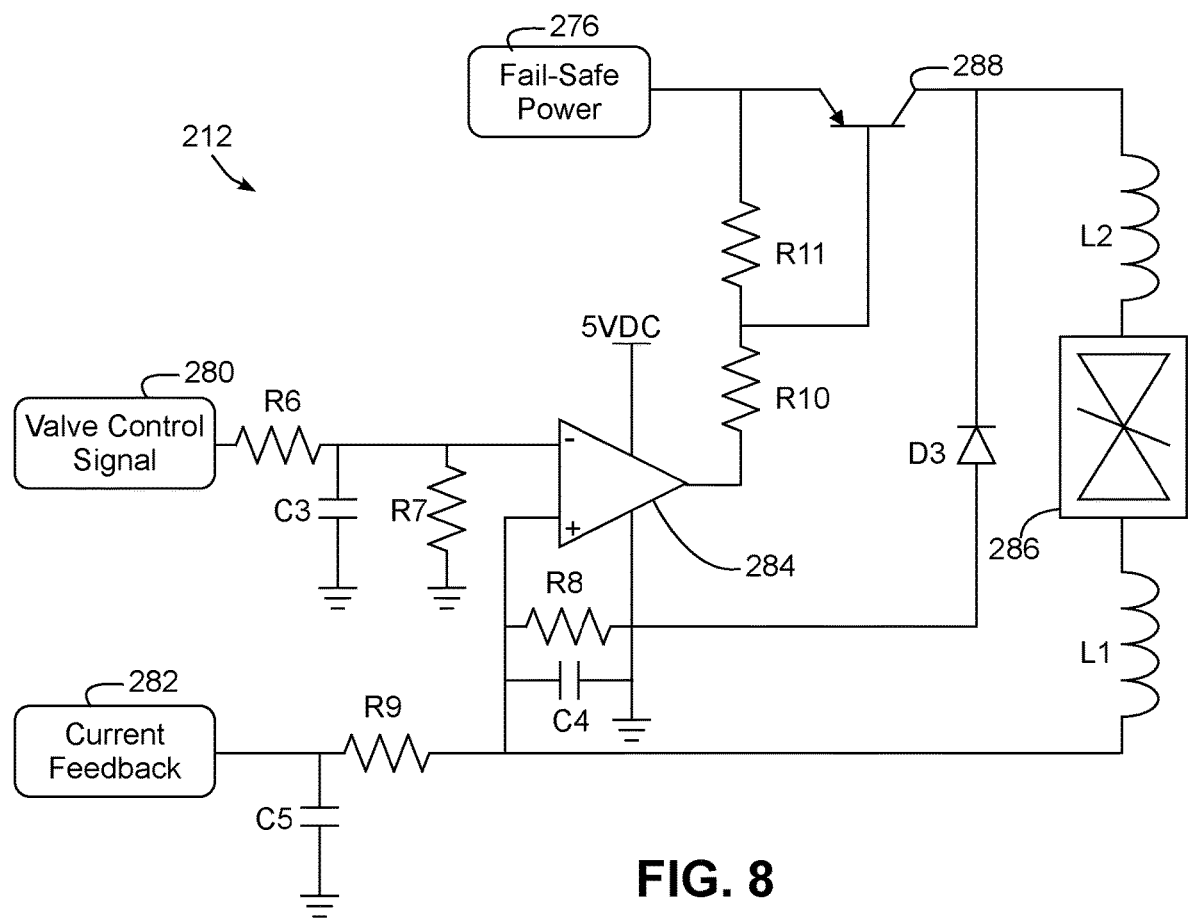
FIG. 8 is a circuit diagram of an example implementation of one of the proportional valve driver circuits referenced in FIG. 5.

FIG. 8 illustrates one of the proportional valve drivers 212 in greater detail. Driver 212 receives as input the fail-safe power 276 as well as a valve control signal 280, which in the illustrated embodiment may be a pulse width modulated (PWM) signal that drives the proportional valve. In addition, a current feedback signal 282 is returned to the controller to provide for closed loop control of the proportional valve.

Valve control signal 280 is coupled to a negative input of a differential comparator 284 (e.g., an LM339 comparator) through a resistor R6, which is further coupled to ground through a parallel arrangement of capacitor C3 and resistor R7. A positive input of differential comparator 284 is coupled to ground through a parallel arrangement of resistor R8 and capacitor C4 and to one input of a proportional valve 286 through a ferrite L1, the other input of which is coupled to the fail-safe power input 276 via a ferrite L2 and a PNP BJT transistor (e.g., an MMBT4403 transistor) 288. The positive input is also coupled to ground through a resistor R9 and capacitor C5, and current feedback signal 282 is coupled to the junction between resistor R9 and capacitor C5. Ferrites L1 and L2 are disposed in series with the leads for proportional valve 286 to reduce sparking noise from coupling back into the controller.

The collector of transistor 288 is coupled to proportional valve 286 and is coupled to ground through a reverse biased diode D3. The emitter of transistor 288 is coupled to the fail-safe power input 276, and the base of transistor 288 is coupled to the output of differential comparator 284 through a resistor R10 and to the emitter through a resistor R11. Controller 206 may therefore regulate the position of the proportional valve 286 by controlling the PWM valve control signal 280.

Figure 9:
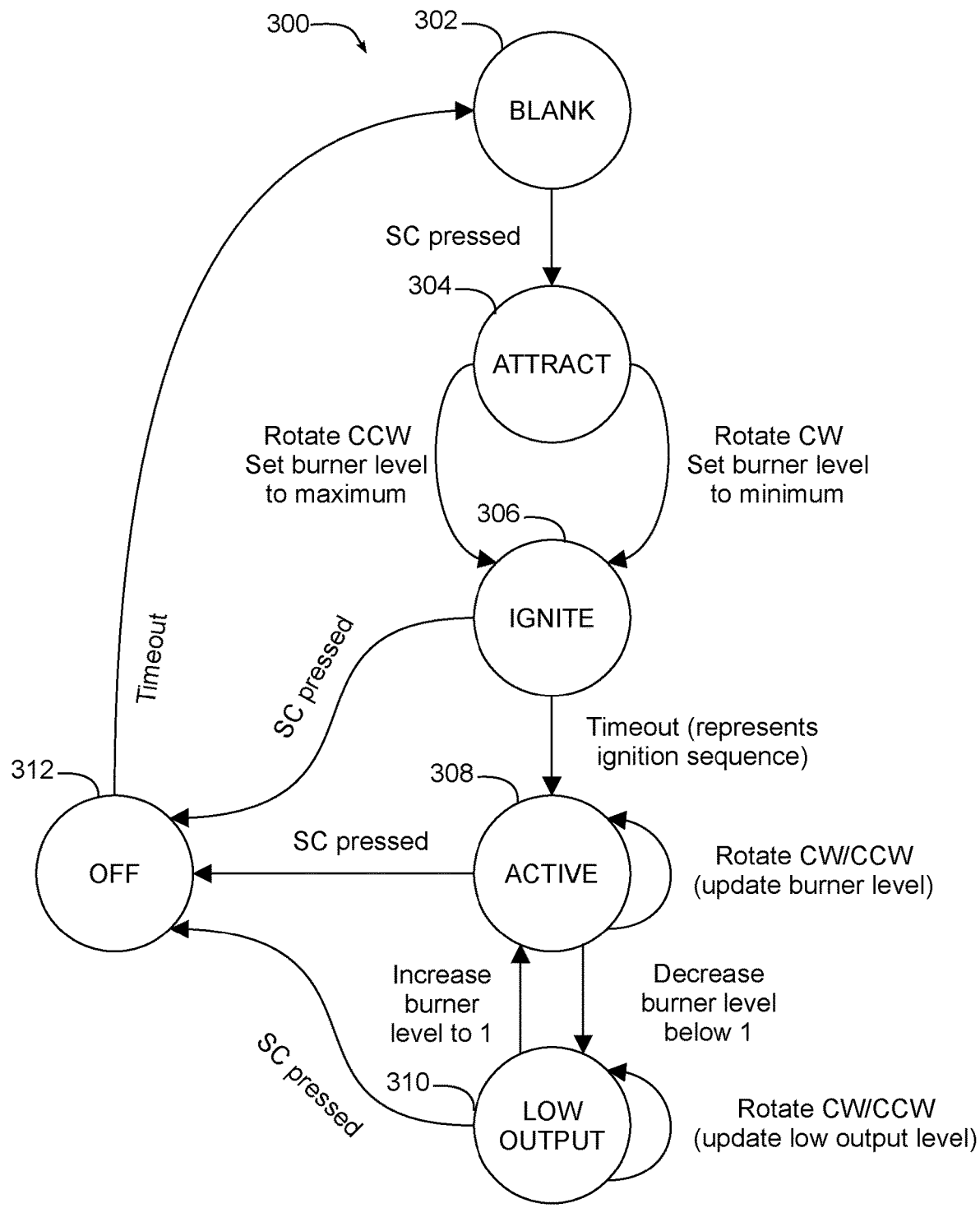
FIG. 9 is a state diagram for an example rotary burner control user interface for the electronic control system of FIGS. 5-6.

As noted above, control over each gas burner may be based in part on a state machine that defines the operation of the rotary burner control. FIG. 9, for example, illustrates an example state diagram 300 including a series of states 302-312 that define one suitable manner of controlling a gas burner. A blank state 302 occurs when the cooking appliance is active but the gas burner is not. Activating the secondary control (e.g., applying an axial force to the rotary control actuator) may transition to an attract state 304, which may cause the user interface to display an "attract" mode that indicates to a user that the burner is ready to be activated. In some embodiments, a "racetrack" display may be generated, where LED segments are sequentially illuminated around the periphery of the display to simulate cars racing around a racetrack. Any other suitable display, such as scrolling text and/or other animations, may also be used in other embodiments.

Next, rotation of the rotary control actuator in either a clockwise or counterclockwise direction may transition to an ignite state 306. Clockwise rotation, for example, may be used to set the initial burner level to a minimum burner level, while counterclockwise rotation may be used to set the initial burner level to a maximum burner level. At this time, an ignition sequence is activated, whereby the electromechanical valve unit for the burner is configured to output gas at a flow rate suitable for ignition while ignition module 218 drives the igniter to light the burner. At the completion of this sequence (represented by a timeout), a transition occurs to an active state 308, whereby rotation of the rotary control actuator updates the burner level, with appropriate control over the electromechanical valve unit. In some instances, such control may include selectively activating the stepper motor to activate or deactivate an outer burner element if the burner is a dual burner.

In addition, in some embodiments, a low out or simmer mode may be supported, whereby the gas burner may be cycled on and off to supply lower output power than can be obtained at the lowest constant output level of the burner. Thus, if the rotary control actuator is turned in a clockwise direction past a predetermined level (e.g., a "1" level in the illustrated embodiment), a transition may occur to a low output state 310. Further rotation of the rotary control actuator in each direction may thus adjust the output level of the burner, and transition between states 308 and 310 as appropriate. In order to turn off the burner, the secondary control may be activated in any of states 306, 308 and 310 and cause a transition to an off state 312, during which the ignitor is deactivated and the electromechanical valve unit is closed.

Figure 10A:
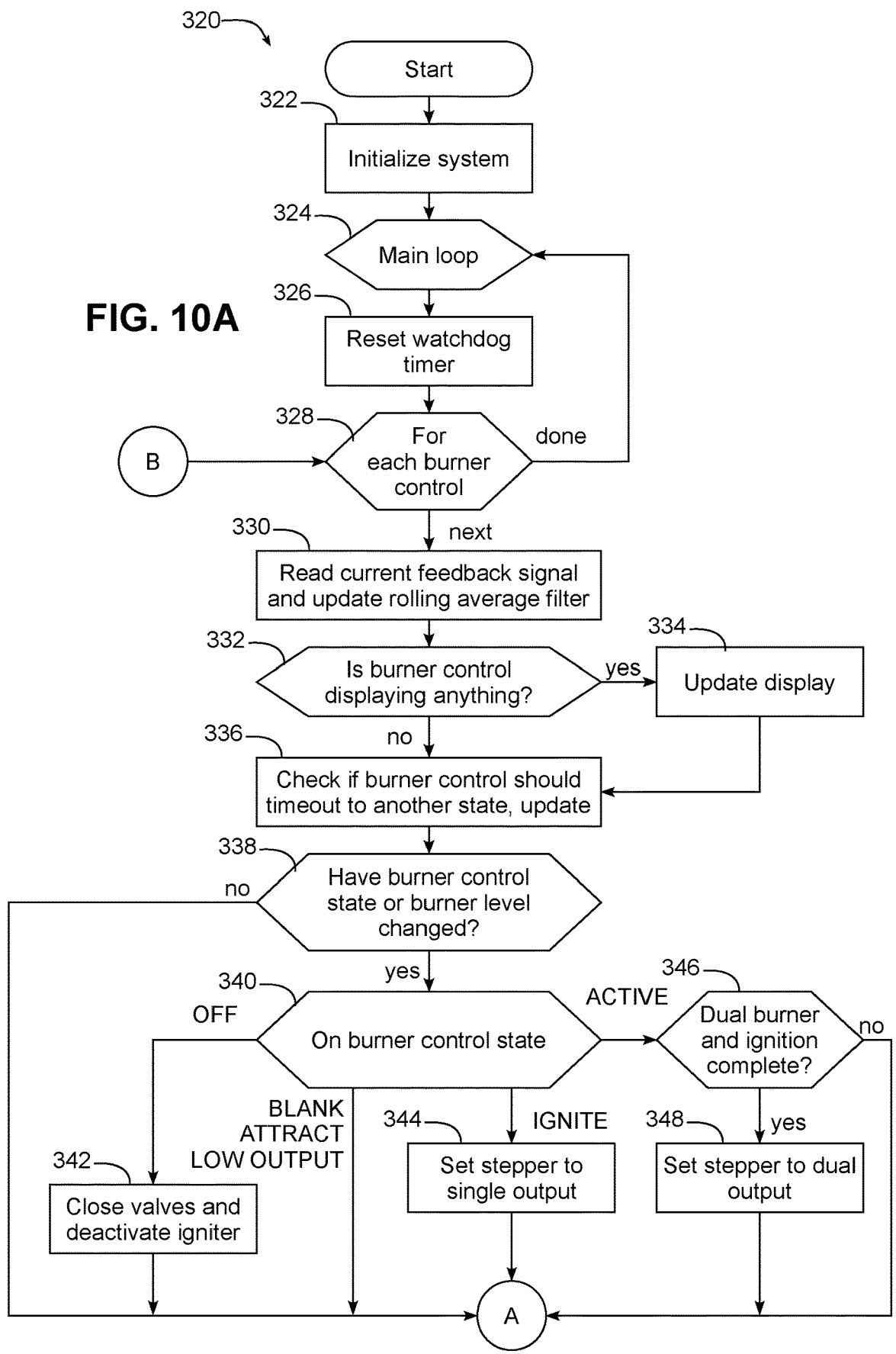
FIGS. 10A-10B are flowcharts illustrating an example sequence of operations for controlling a set of gas cooktop burners using the electronic control system of FIGS. 5-6.
Figure 10B:
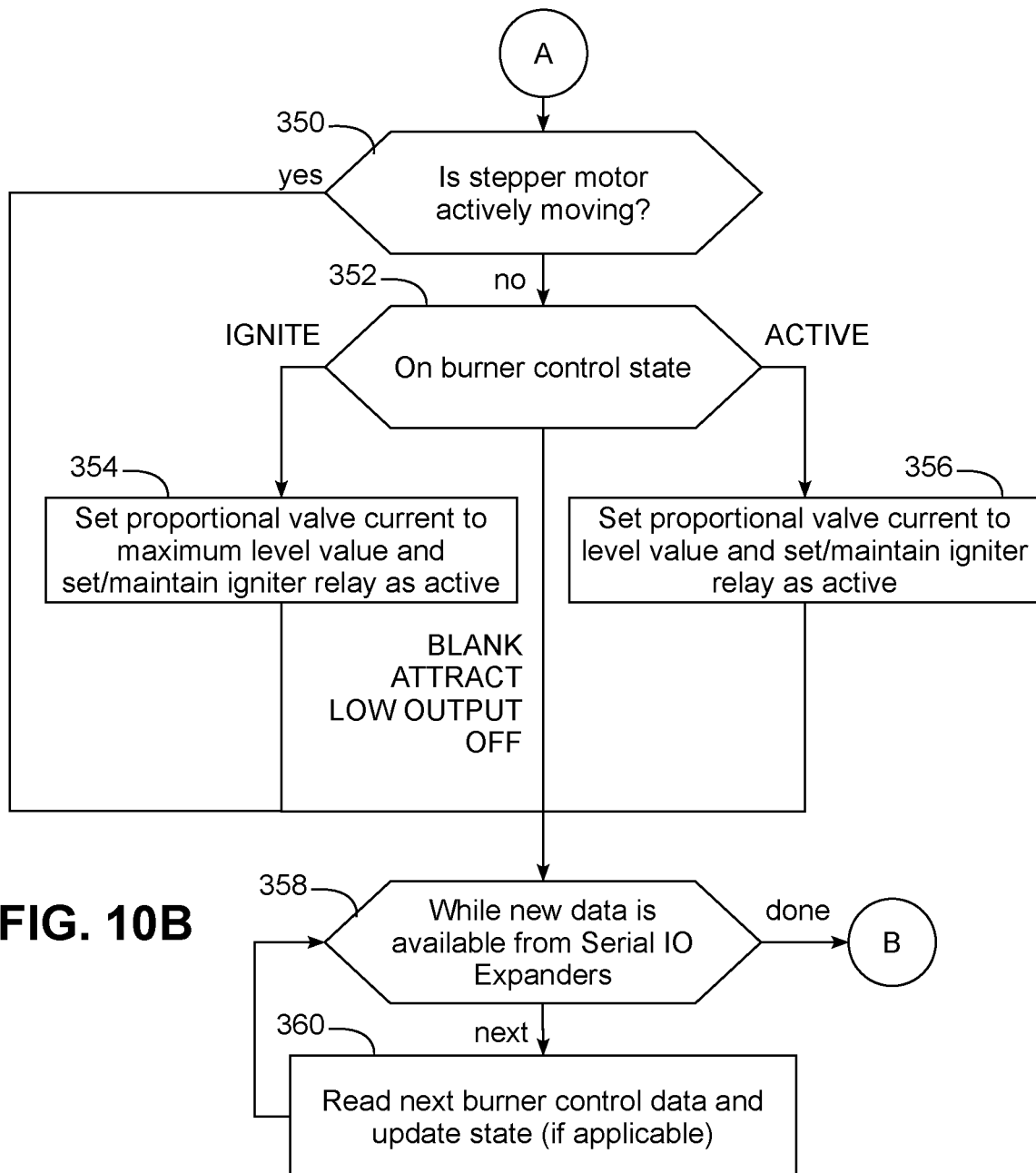

FIGS. 10A-10B next illustrate an example sequence of operations 320 for use in controller 206 to implement state machine 300. At startup, the system is initialized in block 322, e.g., by setting a watchdog timer, closing the proportional valves and stepper motors, and setting each of the rotary burner controls to the blank state.

A main loop is then initiated in block 324, resetting the watchdog timer in block 326 and initiating a FOR loop in block 328 to process each rotary burner control. For each control, block 330 reads the current feedback signal for the valve and updates a rolling average filter, and block 332 determines whether the rotary burner control is configured to display any information (e.g., an attract pattern, an ignition indicator, an on/off state, an output level, etc.). If so, control passes to block 334 to update the display for the rotary burner control, and control passes to block 336 to determine if the burner control should be timed out into another state, and if so, update the state of the rotary burner control accordingly. Returning to block 332, if the control is not configured to display any information, block 334 is bypassed.

Block 336 next passes control to block 338 to determine if the state of the rotary burner control or the burner level has changed. If so, control passes to block 340, which based upon the new or existing state of the control, selectively performs various operations. If a transition occurs to the off state, control passes to block 342 to close the proportional valve and stepper valve for the rotary burner control and deactivate the ignitor, thereby deactivating the burner. Control then passes to block 350 (shown in FIG. 10B).

Returning to block 340, if the state is an ignite state, control passes to block 344 to set the stepper motor to the single output position, whereby control then passes to block 350. If the state is an active state, control instead passes from block 340 to block 346 to determine whether ignition is complete and the burner is a dual burner. If so, control passes to block 348 to set the stepper valve to the dual output position, thereby activating both elements of the dual burner, and then to block 350. If block 346 determines either that the burner is not a dual burner or that ignition is not complete, block 348 is bypassed. Returning once again to block 340, if the state is blank, attract or low output, control passes directly to block 350, and returning to block 338, if no change has been sensed for the rotary burner control, control also passes directly to block 350.

With reference to FIG. 10B, block 350 next determines whether the stepper motor is currently active, indicating that the stepper valve is transitioning between positions. If not, control passes to block 352, which transitions to one of blocks 354, 356 and 358 based upon the state of the rotary burner control. If in the ignite state, control passes to block 354 to set the proportional valve to a maximum level value (or other suitable level for ignition) and set or maintain the igniter relay in an active state, thereby initiating ignition of the burner. If in the activate state, control passes to block 356 to set the proportional valve current to achieve the currently-selected output level, while setting or maintaining the igniter relay in the active state. If in any other state, blocks 354 and 356 are bypassed and control passes directly to block 358, and similarly, if block 350 determines that the stepper motor is still transitioning, control passes directly to block 358.

In block 358, a FOR loop is initiated to poll the serial IO expander for each rotary burner control to obtain the encoder and secondary control inputs therefrom. For each control, block 360 is executed to read the burner control data and update the state of the rotary burner control if applicable.

Once the data for each rotary burner control has been collected, control returns to block 328 of FIG. 10A to cycle through to the next rotary burner control. Once all rotary burner controls have been processed, block 328 then returns control to block 324 to restart the main loop, including resetting the watchdog timer in block 326 and reprocessing the rotary burner controls in the FOR loop initiated in block 328.

It will be appreciated that the electronic control system described herein is merely exemplary in nature, and particularly given the flexibility supported by the herein-described architecture, a wide variety of alternate burner control and/or user interactions may be used in other embodiments.

Temperature-Based Power Supply Overload Protection

It will generally be appreciated that a cooking appliance environment can present challenges for electronic components housed in a cooking appliance, as the performance of some electronic components can vary with ambient temperature. Cooking appliances with self-clean oven features, in particular, can be particularly challenging due to the fact that self-clean cycles often generate temperatures of 500 degrees Celsius or more within an oven cavity, and some of this heat will necessarily increase the ambient temperature elsewhere in the cooking appliance.

Figure 11:
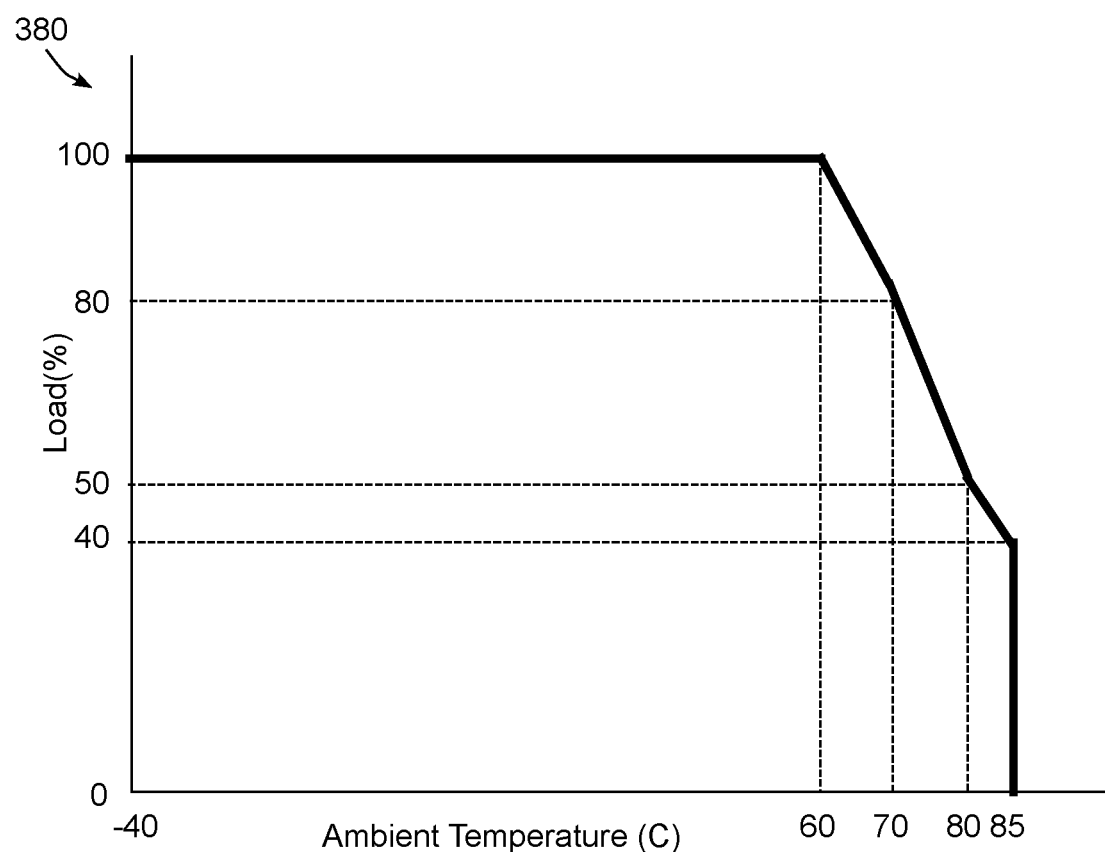
FIG. 11 is a graph illustrating a derating curve for an example low voltage power supply suitable for implementation in the electronic control system of FIGS. 5-6.

One such electronic component that can vary in performance based on ambient temperature is a low voltage power supply, such as low voltage power supply 222 of FIG. 5. From the perspective of a low voltage power supply, the performance variation can manifest in terms of its maximum output capability, i.e., the maximum amount of power that the power supply can supply to the various electrical loads supported by the power supply without incurring damage. FIG. 11, for example, illustrates an example derating curve 380 for a representative low voltage power supply, where up to an ambient temperature of about 60 degrees Celsius, the power supply may be operated at 100% of its rated output capability (e.g., a maximum power rating, a maximum current rating, and/or a maximum voltage rating) without adverse impacts. Above this ambient temperature, however, the output capability (e.g., based on power, current and/or voltage) begins to drop, until a maximum temperature (e.g., about 85 degrees Celsius) is reached, at which the maximum output capability has been reduced to about 40% of its rated output capability.

Once solution to address this concern is to utilize a power supply that is capable of delivering sufficient power even at higher temperatures. Such a power supply, however, would be unnecessarily large and expensive and would rarely be needed during normal use of the cooking appliance, and would only be needed for worst case conditions (e.g., using the cooktop during an oven self-clean cycle).

Embodiments consistent with the invention, on the other hand, may approach this problem by intelligently limiting the load of the power supply based upon the ambient temperature to which the power supply is being subjected. Specifically, a cooking appliance may include a housing, one or more cooking elements, a plurality of electrical loads, a low voltage power supply disposed within the housing and configured to supply power to the electrical loads, a temperature sensor disposed proximate the low voltage power supply and configured to sense an ambient temperature proximate the low voltage power supply, and a controller coupled to the electrical loads and the temperature sensor. The controller may be configured to determine an output capability of the low voltage power supply based upon the ambient temperature sensed by the temperature sensor and to selectively reduce a power consumption of at least one of the electrical loads in response to determining that a combined power consumption of the electrical loads would exceed the determined output capability of the low voltage power supply at the ambient temperature sensed by the temperature sensor.

In particular, temperature sensor 228 of FIG. 5 may be positioned proximate to low voltage power supply 222 to sense the ambient temperature proximate low voltage power supply 222. In many instances, the temperature sensor may be a relatively inexpensive temperature sensor, and a software technique, e.g., as implemented on controller 206, may be used to intelligently control at least a portion of the electrical loads powered by the power supply to maintain a combined power consumption that meets the reduced output capability of the power supply at the sensed ambient temperature.

The electrical loads that may be regulated in order to reduce combined power consumption may vary in different embodiments. The electrical loads in some instances may include electrical loads where the power consumption is actively monitored or sensed, while in other instances, the electrical loads may include electrical loads whether the power consumption is measured or otherwise determined prior to operation, and are represented by stored values rather than sensed values. The stored values may be constant in some instances, e.g., for loads that are generally unvarying in operation, while in other instances, the stored values may be operation-dependent, e.g., for loads that vary in operation in different scenarios, but are otherwise predictable based upon their operational states. In the latter instances, the operation-dependent stored values may have associated formulas or tables that represent the power consumption of those loads in different operational states.

The electrical loads may include both loads that are controllable by a controller to vary their power consumption as well as loads that may not be controllable to reduce combined power consumption, but that nonetheless must be factored into calculations of the combined power consumption. From the perspective of a cooking appliance, and in particular, a gas cooking appliance incorporating an electronic control system such as described above, electrical loads may include one or more of proportional valves, stepper valves, rotary burner controls, user interfaces or displays, igniters, igniter relays, communication interfaces, support circuitry, and even the controller itself.

Moreover, selectively reducing a power consumption of at least one electrical load to reduce the combined power consumption may take various forms in different embodiments. For example, in some embodiments, various electrical loads may be disabled or configured in a lower power consumption state to reduce the combined power consumption. Further, in some embodiments, e.g., the electronic control systems described herein, the reduction in power consumption may be implemented at least in part by controlling an electromechanical valve unit for a gas burner to reduce an output level of the gas burner. Particularly where an electromechanical valve unit that incorporates a current-controlled proportional valve, the electrical power consumption of such a valve is generally configured to increase as the output level of the gas burner is increased, so lowering the output level of such a gas burner level may also lower the power consumption of its associated proportional valve. Moreover, as described above, controller 206 is provided with a current feedback signal 282 that is used in controlling the proportional valve, and this signal may further be used to sense the power consumption of the proportional valve in connection with overload protection as described herein.

In the illustrated embodiment, for example, a number of components described above may be considered to be electrical loads from the perspective of overload protection, with the proportional valves representing significant contributors to power consumption. Each proportional valve, for example, which is operated in a current control mode and that may be monitored by the controller, and in one example embodiment, the operating valve current may range from about 167 mA (4 W power at 24V) and about 50 mA (1.2 W power at 24V). When the burner is off the proportional valve current and power are zero.

Stepper motors in some embodiments may be considered to be electrical loads, although in some embodiments, stepper motor loads are transient, and generally only operated for relatively brief durations. Thus, in some embodiments, these components may be ignored for the purposes of overload protection.

Ignition relays, as noted above, may drive an ignition module with flame rectification and re-ignition, thereby requiring the relay output to remain closed for the duration of burner operation, e.g., with a power draw of about 0.2 W when the associated burner is being operated.

Each rotary burner control user interface may have a variable load based on the number of segments illuminated on each display. In one example embodiment, the power draw of a display may be calculated as follows from Table I:

TABLE I

| Burner Level | #Segments | Current (mA) | Power (mW) |
| --- | --- | --- | --- |
| 1 | 2 | 10 | 50 |
| 2 | 5 | 25 | 125 |
| 3 | 5 | 25 | 125 |
| 4 | 4 | 20 | 100 |
| 5 | 5 | 25 | 125 |
| 6 | 6 | 30 | 150 |
| 7 | 3 | 15 | 75 |
| 8 | 7 | 35 | 175 |
| 9 | 5 | 25 | 125 |
| 10 | 8 | 40 | 200 |
| 11 | 4 | 20 | 100 |
| 12 | 7 | 35 | 175 |

The power for each operated burner valve may be added together, and in some instances, additional fixed power associated with the user interface circuits, e.g., of about 0.1 W, may also be added to the combined power consumption. In addition, the controller and its associated circuits may include additional power consumption, e.g., about 1 W in some embodiments.

Reductions in electrical load consumption may also vary in different embodiments. As one example, reductions may be based on lowering the output level of one or more gas burners. In some instances, the reductions may be implemented in response to state changes among the gas burners, e.g., due to gas burners being activated or deactivated, or based on the output levels of one or more gas burners changing. In some instances, for example, a reduction may be implemented by denying a request to increase in output level of a gas burner, e.g., to not increase an output level of the gas burner in response to a user turning the rotary burner control in response to determining that the combined power consumption after increasing the output level of the gas burner would exceed the determined output capability of the power supply at the ambient temperature currently sensed by the temperature sensor. As another example, reductions may be implemented by increasing the output level of the gas burner a smaller amount than originally requested, rather than simply denying the request. As yet another example, reductions may be implemented by decreasing the output level of a different gas burner while satisfying the original request to increase the output level of the original gas burner.

In some instances, reductions may be based on increases in ambient temperature, and may be implemented by decreasing the output levels of one or more gas burners. Decreases may be implemented based on various priorities, e.g., based upon the order in which burners were changed in output level and/or initially activated, or based on burner current output level, burner position, burner size, burner capacity, etc. Decreases may focus on a single burner or the decreases may be shared by multiple burners. In one example embodiment, decreases may be prioritized to affect the most recently changed burners.

Figure 12:
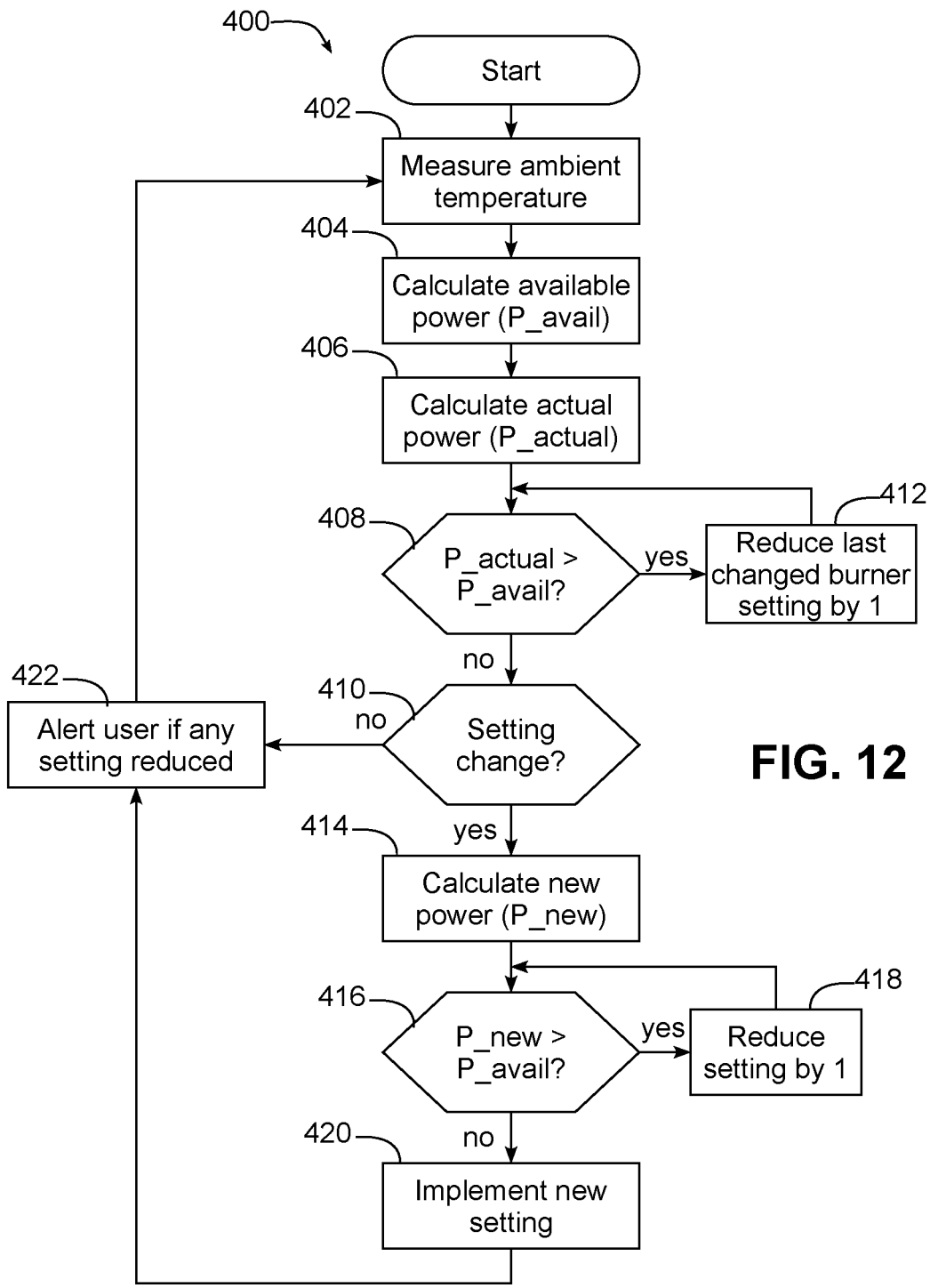
FIG. 12 is a flowchart illustrating an example sequence of operations for implementing temperature-based power supply overload protection in the electronic control system of FIGS. 5-6.

FIG. 12, for example, illustrates an example sequence of operations 400 for implementing temperature-based power supply overload protection in cooking appliance 200. First, in block 402, ambient temperature may be measured (e.g., with a power supply-adjacent ambient temperature sensor), and in block 404 the available power (P_avail) may be calculated, e.g., based upon the sensed temperature and a derating curve for the power supply. In some embodiments, for example, a temperature-dependent function or lookup table may be used to determine available power. For the derating curve of FIG. 11, for example, the following function may be used:

if (T<=60 C) output=100
else if (T<=70 C) output=100−2*(T−60)
else if (T<=80 C) output=80−3*(T−70)
else if (T<=85 C) output=50−2*(T−80)
else if (T>85 C) output=0

Next, in block 406, actual power (P_actual) may be calculated, e.g., based on stored and/or sensed valves for the various electrical loads in the system. In an example embodiment where 5 burners are supported, with each burner utilizing a proportional valve, stepper valve, igniter relay and control-specific display such as illustrated above in FIGS. 5-6, an example actual power when all 5 burners are operating at full power may be calculated as follows:

1. Proportional valve power: 5 valves at 4 W each=20 W
2. Stepper motor power: transient load only (negligible thermal impact)
3. Igniter relays: 5 relays at 0.2 W each=1 W
4. User interface: 5 displays showing "12"=5*0.175+ 0.1=1 W
5. Controller and associated circuitry=1 W Total continuous load on power supply=20+1+1+1=23 W (For an example 30 W supply, 23 W=76.7% of full load.)

Next, block 408 determines whether the actual power exceeds the available power. For example, as long as the P_actual power supply load percentage (which may be recalculated anytime a control setting is changed) is less than the P_avail percentage as calculated above, then no load adjustment is required, and control may pass to block 410 to determine if any setting has changed. However, if the calculated load percentage would exceed the allowed percentage, block 408 may pass control to block 412 to reduce the output level of the last-changed burner, and then return control to block 408 to determine whether further reductions are needed.

Once sufficient reductions have been made, block 408 then passes control to block 410 to determine whether any settings have changed (e.g., a burner has been activated or deactivated and/or a burner has changed in output level). If so, control passes to block 414 to calculate a new power (P_new) based on the requested setting change. Block 416 then determines whether the requested setting change would exceed the available power, and if not, pass control to block 418 to reduce the changed setting by one (e.g., to lower or deny a requested increase in output level or activation of a burner, to decrease or deactivate another burner to offset any requested increase, etc.). Control then returns to block 416 to reevaluate whether sufficient reductions have been made, and once the new power does not exceed the available power, control passes to block 420 to implement the new setting.

Control next passes to block 422 to optionally alert a user if any setting has been reduced, e.g., through an audible alert such as a beep, a message on a display, or some animation of the display for a reduced rotary burner control. Control then returns to block 402. In addition, returning to block 410 if no setting was changed, control passes to block 422 to optionally alert the user, and then to block 402.

It will be appreciated that various modifications may be made to the embodiments discussed herein, and that a number of the concepts disclosed herein may be used in combination with one another or may be used separately. Therefore, the invention lies in the claims hereinafter appended.

What is claimed is:

1. A method of operating a cooking appliance, the method comprising:
operating a plurality of cooking elements, wherein operating the plurality of cooking elements includes powering a plurality of electrical loads with a low voltage power supply, the low voltage power supply having a temperature-dependent output capability;
sensing an ambient temperature proximate the low voltage power supply using a temperature sensor;
determining an output capability of the low voltage power supply based upon the ambient temperature sensed by the temperature sensor; and selectively reducing a power consumption of at least one of the plurality of electrical loads in response to determining that a combined power consumption of the plurality of electrical loads would exceed the determined output capability of the low voltage power supply at the ambient temperature sensed by the temperature sensor.

2. A cooking appliance, comprising:
a housing;
one or more cooking elements;
a plurality of electrical loads;
a low voltage power supply disposed within the housing and configured to supply power to the plurality of electrical loads, the low voltage power supply having a temperature-dependent output capability;
a temperature sensor disposed proximate the low voltage power supply and configured to sense an ambient temperature proximate the low voltage power supply; and
a controller coupled to the plurality of electrical loads and the temperature sensor, the controller configured to determine an output capability of the low voltage power supply based upon the ambient temperature sensed by the temperature sensor and to selectively reduce a power consumption of at least one of the plurality of electrical loads in response to determining that a combined power consumption of the plurality of electrical loads would exceed the determined output capability of the low voltage power supply at the ambient temperature sensed by the temperature sensor.

3. The cooking appliance of claim 2, wherein each cooking element comprises a gas burner, wherein the plurality of electrical loads includes a plurality of electromechanical valve units, each electromechanical valve unit configured to couple a respective gas burner of the plurality of cooking elements to a gas supply and to regulate an output level of the respective gas burner, and wherein the controller is configured to selectively reduce the power consumption of at least one of the plurality of electrical loads by controlling the electromechanical valve unit for at least one gas burner to selectively reduce an output level thereof.

4. A cooking appliance, comprising:
a housing including an oven cavity and a cooktop;
a plurality of gas burners disposed on the cooktop;
a plurality of electrical loads, the plurality of electrical loads including a plurality of electromechanical valve units, each electromechanical valve unit configured to couple a respective gas burner of the plurality of gas burners to a gas supply and to regulate an output level of the respective gas burner;
a low voltage power supply disposed within the housing and subject to heat generated within the oven cavity, the low voltage power supply configured to supply power to the plurality of electrical loads and having a temperature-dependent output capability;
a temperature sensor disposed proximate the low voltage power supply and configured to sense an ambient temperature proximate the low voltage power supply; and
a controller coupled to the plurality of electrical loads and the temperature sensor, the controller configured to determine an output capability of the low voltage power supply based upon the ambient temperature sensed by the temperature sensor and to control the electromechanical valve unit for at least one of the plurality of gas burners to selectively reduce an output level of the at least one gas burner in response to determining that a combined power consumption of the plurality of electrical loads would exceed the determined output capability of the low voltage power supply at the ambient temperature sensed by the temperature sensor.

5. The cooking appliance of claim 4, wherein each electromechanical valve unit includes a proportional valve, and wherein the controller is configured to determine the combined power consumption using a sensed power consumption for each proportional valve.

6. The cooking appliance of claim 5, wherein each proportional valve is a current controlled proportional valve, and wherein the controller is configured to determine the sensed power consumption for each proportional valve by sensing a current for each proportional valve.

7. The cooking appliance of claim 5, wherein each electromechanical valve unit further includes a stepper valve in series with the proportional valve thereof.

8. The cooking appliance of claim 4, wherein the plurality of electrical loads further includes a plurality of rotary burner controls, each rotary burner control configured to receive user input directed to a respective gas burner of the plurality of gas burners, wherein the controller is configured to determine the combined power consumption of the plurality of electrical loads using power consumption determined for each of the plurality of rotary burner controls.

9. The cooking appliance of claim 8, wherein the plurality of electrical loads further includes one or more user interfaces configured to display status information for the plurality of gas burners, wherein the controller is configured to determine the combined power consumption of the plurality of electrical loads using power consumption determined for the one or more user interfaces.

10. The cooking appliance of claim 9, wherein the one or more user interfaces includes a plurality of electronic burner control user interfaces, each electronic burner control user interface dedicated to a respective rotary burner control of the plurality of rotary burner controls and to a respective gas burner of the plurality of gas burners to display status information for the respective gas burner.

11. The cooking appliance of claim 10, wherein each electronic burner control user interface is positioned on or adjacent to a rotary control actuator of the respective rotary burner control.

12. The cooking appliance of claim 11, wherein each electronic burner control user interface comprises a multi-segment, multi-digit LED display and includes a plurality of LED segment inputs and a plurality LED digit inputs, and wherein the controller is configured to determine a power consumption for each electronic burner control user interface based on a number of segments being illuminated thereby.

13. The cooking appliance of claim 4, further comprising a plurality of igniters, each igniter positioned adjacent a respective gas burner of the plurality of gas burners, wherein the plurality of electrical loads further includes a plurality of igniter relays, each igniter relay configured to drive a respective igniter of the plurality of igniters, wherein the controller is configured to determine the combined power consumption of the plurality of electrical loads using power consumption determined for each of the plurality of igniter relays.

14. The cooking appliance of claim 4, wherein the controller is configured to determine the combined power consumption of the plurality of electrical loads further using a power consumption determined for the controller itself.

15. The cooking appliance of claim 4, wherein the controller is configured to receive user input that requests an increase in output level of a first gas burner of the plurality of gas burners, and to deny the request to increase the output level of the first gas burner in response to determining that the combined power consumption of the plurality of electrical loads after increasing the output level of the first gas burner would exceed the determined output capability of the low voltage power supply at the ambient temperature sensed by the temperature sensor.

16. The cooking appliance of claim 4, wherein the controller is configured to receive user input that requests an increase in output level of a first gas burner of the plurality of gas burners to a first output level, and to increase the output level of the first gas burner to a second output level that is lower than the first output level in response to determining that the combined power consumption of the plurality of electrical loads after increasing the output level of the first gas burner to the first output level would exceed the determined output capability of the low voltage power supply at the ambient temperature sensed by the temperature sensor.

17. The cooking appliance of claim 4, wherein the controller is configured to receive user input that requests an increase in output level of a first gas burner of the plurality of gas burners, and to lower the output level of a second gas burner of the plurality of gas burners in response to determining that the combined power consumption of the plurality of electrical loads after increasing the output level of the first gas burner would exceed the determined output capability of the low voltage power supply at the ambient temperature sensed by the temperature sensor.

18. The cooking appliance of claim 4, wherein the controller is configured to set an output level of a first gas burner of the plurality of gas burners to a first output level in response to user input, and in response to an increase in ambient temperature sensed by the temperature sensor after the first gas burner is set to the first output level, decrease the output level of the first gas burner to a second output level that is lower than the first output level in response to determining that the combined power consumption of the plurality of electrical loads would exceed the determined output capability of the low voltage power supply at the increased ambient temperature sensed by the temperature sensor.

19. The cooking appliance of claim 18, wherein the controller is configured to select the first gas burner for a decrease in output level in response to the increased ambient temperature sensed by the temperature sensor based upon the output level of the first gas burner being most recently changed in response to user input.

20. The cooking appliance of claim 4, wherein the oven cavity includes one or more oven cooking elements, and wherein the controller is configured to operate the one or more oven cooking elements to perform a self-clean cycle, and to selectively reduce the output level of the at least one gas burner in response to determining that the combined power consumption of the plurality of electrical loads would exceed the determined output capability of the low voltage power supply at the ambient temperature sensed by the temperature sensor during the self-clean cycle.

21. The cooking appliance of claim 4, wherein the controller is further configured to generate a user alert in connection with selectively reducing the output level of the at least one gas burner.

\* \* \* \* \*